United States Patent [19]

Sonobe

[11] Patent Number: 5,404,520
[45] Date of Patent: Apr. 4, 1995

[54] DATA INPUT/OUTPUT CONTROL SYSTEM

[75] Inventor: Masayuki Sonobe, Urayasu, Japan

[73] Assignee: Fujitsu Limited, Kawasaki, Japan

[21] Appl. No.: 55,763

[22] Filed: May 3, 1993

Related U.S. Application Data

[63] Continuation of Ser. No. 429,612, Oct. 31, 1989, abandoned.

[30] Foreign Application Priority Data

Oct. 31, 1988 [JP] Japan .................. 63-273342

[51] Int. Cl.$^6$ .................. G06F 13/00; G06F 15/16
[52] U.S. Cl. .................. 395/650; 395/600; 364/DIG. 1
[58] Field of Search .................. 395/600, 650

[56] References Cited

U.S. PATENT DOCUMENTS

| | | | |
|---|---|---|---|
| 4,356,550 | 10/1982 | Katzman et al. | 364/200 |
| 4,365,295 | 12/1982 | Katzman et al. | 364/200 |
| 4,378,588 | 3/1983 | Katzman et al. | 364/200 |
| 4,414,624 | 11/1983 | Summer, Jr. et al. | 364/200 |
| 4,484,275 | 11/1984 | Katzman et al. | 364/200 |
| 4,672,535 | 6/1987 | Katzman et al. | 364/200 |
| 4,754,394 | 7/1988 | Brantley, Jr. et al. | 364/200 |
| 5,089,985 | 2/1992 | Chang et al. | 395/600 |

OTHER PUBLICATIONS

European Search Report, The Hague, search completed Jul. 16, 1992.
Maurice J. Bach, "The Design of the Unix Operating System", 1986 Prentice/Hall International, Inc., Englewood Cliffs, NJ, USA, p. 112, line 2-p. 117, line 5, FIGS. 5.16-5.19.
5th Int. Conf. on Distributed Systems, 13 May 1985, IEEE, Silver Spring, USA, pp. 99-106; W. Zwaenepoel: "Impementation and Performance of pipes in the V-System", sections 2, 4 and 6.

*Primary Examiner*—Thomas G. Black
*Assistant Examiner*—Peter Y. Wang
*Attorney, Agent, or Firm*—Staas & Halsey

[57] ABSTRACT

A batch type data input and output control system executes a file output program which outputs data to a file stored in an external storage unit from a main storage apparatus, and a file input program for processing the data in the file. An input/output parallel management means for managing parallel processing of the file output program and file input program and a data transfer unit are provided for transferring the data within the main storage unit without transferring the data through the external storage unit. The data written by the file output program is directly transmitted to the file input program, for instance in units of a character or record under control of the input/output parallel management means. The file output program and file input program are executed in parallel, and can be registered or deleted by designation of another program or a user. When one of the file output program and the file input program ends in an abnormal state, the other program is compulsorily ended. When both programs end in a normal manner and a subsequent program is designated, the subsequent program is automatically initiated.

24 Claims, 26 Drawing Sheets

| NAME OF FILE | NAME OF WRITING PROGRAM | STATE OF WRITING PROGRAM 1<br>BEFORE OPEN : 0<br>WAITING FOR READING : 1<br>BEFORE WRITING : 2<br>WAITING FOR READING : 3<br>WAITING FOR READING CLOSE : 9 | ADDRESS AND LENGTH OF WRITING DATA ON MAIN STORAGE 1 | NAME OF READING PROGRAM 1 | STATE OF READING PROGRAM 1<br>BEFORE OPEN : 0<br>WAITING FOR WRITING : 1<br>OPEN : 1<br>WAITING FOR WRITING : 2<br>BEFORE READING : 3<br>WAITING FOR WRITING CLOSE : 9 | ADDRESS AND LENGTH OF READING DATA ON MAIN STORAGE 1 |
|---|---|---|---|---|---|---|
| NAME OF FILE 2 | NAME OF WRITING PROGRAM 2 | STATE OF WRITING PROGRAM 2 | ADDRESS AND LENGTH OF WRITING DATA ON MAIN STORAGE 2 | NAME OF READING PROGRAM 2 | STATE OF READING PROGRAM 2 | ADDRESS AND LENGTH OF READING DATA ON MAIN STORAGE 2 |
| ... | | | | | | |
| NAME OF FILE n | NAME OF WRITING PROGRAM n | STATE OF WRITING PROGRAM n | ADDRESS AND LENGTH OF WRITING DATA ON MAIN STORAGE n | NAME OF READING PROGRAM n | STATE OF READING PROGRAM n | ADDRESS AND LENGTH OF READING DATA ON MAIN STORAGE n |

Fig. 9  (n: NUMBER OF PARALLEL FILES OPERATED IN SYSTEM)

DATA INPUT/OUTPUT CONTROL SYSTEM

This application is a continuation of application Ser. No. 07/429,612, filed Oct. 31, 1989, now abandoned.

BACKGROUND OF THE INVENTION

The present invention relates to a data input/output system in a computer system and more particularly to a data input/output control system in an operating system for executing a data input/output based on a data input instruction to a main storage and a data output instruction from the main storage, the data input and output instructions being issued by a program.

A batch process, the most generally available data process, does not deal immediately with data every time when the data is produced, but with data comprising a certain number of grouped units. For example, where the sales status of goods is recognized, the data is grouped for processing in units of weeks or months. When the units are shorter than those stated above, data grouped in certain units are outputted as a file to an external storage apparatus such as a magnetic disc. After the file is completed, the data in the file can be processed. It is then possible to execute a data input program for processing the data in a file after executing a data output program to store them into the file.

FIG. 1 shows a structural block diagram of a basic sequential access method (BSAM) of the first prior art data input and output control system. A computer comprising central processor unit 1, main storage unit 2 and memory control unit 3 are connected as shown. The inside of main storage unit 2 comprises user memory portion 4 and operating system memory portion 5. User memory unit 4 comprises program memory unit 6 and data memory unit 7. A program named data managing portion 8, which is a part of an operating system (OS), is stored in the operating system memory portion. A program named job task managing portion 9 for managing an initiation and completion of the program, and which is also a part of the operation system is stored in operating system memory portion 5. Further, memory data portion 10, which is used by these two managing portions 8 and 9, is provided. Data input and output means transfer data between peripheral apparatuses of a computer, i.e. between file 12 in magnetic disc apparatus 11 and data memory portion 7 within user memory portion 4 in FIG. 1. The input and output is defined from the viewpoint of data memory portion 7. Magnetic disc control apparatus 13 actually transfers the data between magnetic disc apparatus 11 and memory control apparatus 3. File name memory portion 14 stores the name determined by the user for file 12 within magnetic apparatus 11. Data managing unit 8 comprises open processing portion 15, writing processing portion 16, reading processing unit 17 and close processing unit 18.

FIG. 2 is an operational view for explaining how data is written, namely, how data is outputted from main storage apparatus 2 in FIG. 1. Writing program 19, produced by an operating system in program memory unit 6 and initiated by the user, performs an initializing process as a sequence previously programmed by the user and issues an OPEN instruction. When it receives an OPEN instruction to prepare a file designated by an instruction parameter, open processing unit 15 of data managing unit 8 for the operating system confirms that the magnetic disc apparatus 11 storing the file is available for use and that a file of the same name does not already exist in file name memory unit 14. Then open processing unit 15 stores the address of the area of file 12 in magnetic disc apparatus 11 which can be used for storing the file in the storing area address 20 of data storing unit 10 and returns a control to writing program 19. Then, writing program 19 designates that DATA (1) is requested to be outputted from predetermined address of data memory unit 7 of user memory unit 4 and issues a WRITE instruction. Writing process unit 16 refers storing area address 20 of data store unit 10 and writes the same content as data (1) in the corresponding address of file 12, thereby providing DATA (1). In a similar manner to the above, DATA (2) is formed from data (2) data storing unit 7 and DATA (3) is formed from data (3). Tereafter, writing program 19 issues a CLOSE instruction as data to be written expires. Close process unit 18, which receives CLOSE instruction, writes a code representing a data end (called end of file or EOF) in file 12 and also writes the file name and storing address of file 12 in magnetic disc apparatus 11 in file name storing unit 14 as a form of file control block 21 so that other programs can read them. Thereafter, it returns the control to writing program 19. Then, writing program 19 completes executing a follow-up process, issues a RETURN instruction to declare a completion and is deleted from program memory unit 6 by job task managing unit 9.

FIG. 3 shows a drawing for explaining an operation in which data reading, namely, data input to main storage unit 2, is performed in the structure shown in FIG. 1. Reading program 22 entered into program memory unit 6 by a user is not always immediately initiated. When writing program 19, shown in FIG. 2, is being executed under the same file name as that used by reading program 22, the initiation is kept waiting by job task management 9. Depending on the designation, reading program 22 is kept waiting until writing program 19 issues a RETURN instruction or until writing program 19 issues a CLOSE instruction.

When reading program 22 is initiated, an initial process is executed as a sequence previously programmed by the user and then an OPEN instruction is issued. When open process unit 15 of data managing unit 8 of the operating system receives the OPEN instruction, it confirms that magnetic disc apparatus 11 in which the designated file is stored is available for use and file control block 21 having the particular name of the file already exists in file name storing unit 14, and that file 12 exists. Then, file name memory unit 14 stores the address of the area in which the file is stored in the magnetic disc apparatus 11, in data memory unit 10 and returns the control to reading program 22. Reading program 22 issues a READ instruction by requesting that an item of data be inputted to data memory unit 7 in the user memory unit. Reading unit 17 refers to the area address 20 in data memory unit 10, reads DATA (1) from the corresponding address of file 12 and informs the same content of DATA (1) to data memory unit 7. Similarly, data (2) is formed from DATA (2) and data (3) is formed by DATA (3). Thereafter, reading program 22 issues a READ instruction to read another data element without recognizing the number of data. Then, data does not exist in file 12, so a code of data end (EOF) appears. Thus, reading process unit 17 does not transfer the data, but notifies reading program 22 of "data end". Upon receipt of this notice, reading program 22 issues a CLOSE instruction. Close process unit 18 receives the CLOSE instruction and immediately returns the control to reading program 22. Thereafter, when reading program 22 completes the follow-up process and declares the completion by issuing a RETURN instruction, the process is extinguished by job task management unit 9.

If a job control language designates that reading program 22 is to be initiated immediately after the end of writing program 19 when the user initiates writing program 19, job task management unit 9, which is a program of the designated name from a program library, automatically initiates it immediately after writing program 19 issues RETURN instruction and declares the end of the program. In contrast, when writing program 19 does not reach the end in a normal manner because of an error in the data given by the program or the designation of the stop of execution by the operator, namely, in the case of an abnormal end, reading program 22 using the same file 12 often should not be initiated. In such a case, after the reason for the abnormal ending is deleted, it is necessary to execute writing program 19 again and rewrite file 12 correctly. At this time, job task management unit 9 detects the abnormal state and does not automatically initiate reading program 22.

The above automatic initiation is called a job step control or job control. Two programs having output and input relationships and stored in the same file should necessarily be kept waiting in such a sequential control. Thus, it is usual for a user to write in a job control language that these programs are the job or the job steps to be sequentially executed. Therefore, when writing program 19 of FIG. 2 is completed, reading program 22 for inputting the file is initiated by job task management unit 9. Therefore, there is a problem that the user cannot obtain the result of the completion of two programs unless he waits for a time period equal to the sum of the execution time of both programs 19 and 22.

FIG. 4 is a timing chart showing the above defects of the prior art. In FIG. 4, a temporary high portion of the graph designates that the process is being operated. The circular mark and the arrow show that a start and stop of an operation designated by the head of the arrow mark is conducted by using a start or stop of the operation designated by the circle mark as a trigger. It is supposed that the two programs comprising writing program and reading program are initiated concurrently at the first stage. However, the open process of reading program is kept waiting (as shown by the star mark in FIG. 4) until all the data in the file is written.

FIG. 5 explains "pipe", which is the second prior art of the data input and output control method. A computer storage device comprises user memory apparatus 31, utility memory apparatus 32, shell memory apparatus 33, and kernel memory apparatus 34. The storage apparatus is connected to keyboard apparatus 41 and display apparatus 42. Let us suppose that user 36 provides command 35 as an instruction at the designation of the computer instruction in the form of "cat/pr-l22" from keyboard apparatus 41. In this case, the command is transferred from user memory apparatus 31 to shell memory apparatus 33 and is interpreted in shell command analysis unit 37. The function of "cat", which is the first step in command 35, is to "read a character string from a standard input file and output it to a standard output file" "pr-l22", which is the second command means, "read a standard input file and display it in a standard output file after changing the format to the predetermined format of 22 rows per page". A special symbol "|", which combines these two portions means "operates by making a standard output file of the program executed by the command written on the left side of the symbol to correspond to the standard input of the program executed by the command written on the right side of the symbol. These two commands may be operated simultaneously, namely, by parallel processing."

Shell command analysis unit 37 is an analytical process. It recognizes such designation. "cat" process programs (namely, utility) by using the function of kernel and "pr" utility is produced in an operation unit having, for example, the name of processes P1 and P2 and is arranged in utility memory apparatus 32. An input of process P1 is made to correspond to keyboard apparatus 41 as the standard input file. The standard output 38 from process P1 is inputted to a pipe, namely, a communication path between processes, which is newly set in kernel memory apparatus 34. On the other hand, standard input 39 to process P2 is made to correspond to the output from pipe 40. This operation enables the pipe to connect two processes. Further, display 42 is assigned to the standard output of process P2. When the pipe receives input data, it outputs them without keeping them waiting. Therefore, in this situation, when user 36 inputs a plurality of characters using keyboard apparatus 41, the data written into process P1 by WRITE, is quickly processed by a READ instruction of process P2, independently of how far process P1 advances. Therefore, processes P1 and P2 are processed in parallel.

"pipe" shown in FIG. 5 is a well-known technology, but it has the defect that only programs written by using input instruction READ of the standard input file and output instruction WRITE of the standard output file can be used.

The batch-type READ and WRITE instructions in the first prior art are different in function from READ instruction and WRITE instruction in the above recited pipe, although their spellings are similar. The operating system having a "pipe" function, recited in the second prior art, does not have a job control function for operating the batch program and therefore both batch function and job control function are inconsistent. The terminology "batch" is used in the operating system having a pipe function but this designates a function in which, if a shell command is previously collected and registered, then they can be called in a group. However, it cannot realize the batch type input function provided by a different operating system under the name "BSAM" in the prior art. Therefore, although the terminologies of "batch" are overlapped, the batch used in the operating system having the batch function is completely irrelevant to the data input and output control method according to the present invention. As a method of controlling an input and output in a batch-type manner, in addition to the above recited basic sequence access method, there are a basic partition access method (BPAM) for performing a sequential access after the partition member is found, a basic direct access method (BDAM) for performing a retrieval by designating an address or key, and a queued sequence access method (QSAM) for performing an access in units of records. These methods are similar in that they keep an open process of reading program waiting until all the data of the file is written, as shown in FIG. 4.

An online method of the third prior art of the data input and output control method is explained by referring to FIG. 6. A plurality of processes P1, P2, P3, P4 ... P43 to P46 constituting a system, exchange messages between each other by going through buffer 47 or files. According to this method, it is possible for other processes, for example, process P2 44 to read by READ instruction a message which is outputted to buffer 47 by process P1 43, namely, to perform a parallel process of writing programs and reading programs.

However, in an online method, in order to transfer and receive the message between a plurality of processes it is necessary for the kind of the message and the identification of the destination of the message to be provided in the inside of the input and output data or an environment file corresponding to a program. The corresponding relationship between the output and input programs is not particularly well defined. For example, when the message transfer from process P1 43 to process P3 45 is completed, there is a possibility that the message transfers, for example, from process P4 46 to process P3 45, thereby making it difficult to complete the input program of the point P3 45. Because of these differences, it is impossible to realize an online method of input and output parallel processes by using the batch type input and output control method which is the object of the present invention.

In the prior art batch type data input and output control method, namely, the method for allowing a start of the execution of the program for inputting the data of the file after all the data constituting the file prepared by the program is outputted, it is impossible to perform a parallel processing between a file output program and a file input program for processing the file data. Thus, there is a problem that it takes longer to execute the whole process than where a parallel processing is possible.

SUMMARY OF THE INVENTION

An object of the present invention is to enable both the file output program for issuing the data output instruction and file input program issuing the data input instruction within the file to be executed in parallel without waiting for the time an execution of the file output program is completed, in a batch type data input and output control method.

A feature of the present invention resides in a batch type data input/output control system for executing a file output program for outputting data from main storage unit to an external storage unit to form a file in said external storage unit and a file input program for processing the data in the file formed in said external storage unit by an execution of said file output program. The data input/output control system is controlled by an operating system which comprises a data management unit for controlling a writing and reading of data, a job task management unit for managing an initiation, waiting and end of a program, and a data memory unit used when said job task management unit and said data management unit execute said file output program and file input program. The operating system further comprises an input/output parallel management unit for managing parallel processing of said file output program and input program, an input/output parallel control unit including a data transfer unit for transferring data in said main storage unit based on the control of said input/output parallel management unit without going through said external storage unit, an input/output parallel management table for storing the name of the file output program and file input program using the same file in said data memory unit, and a parallel designation register.deletion processing unit provided in said job.task management unit for changing the content of said input/output parallel management table in accordance with the designation by a program other than the file output program and file input program or the user. The file input program is executed in parallel with the file output program which is designated by said other program or said user, without waiting for a completion of an execution of said file output program.

BRIEF DESCRIPTION OF THE DRAWINGS

FIG. 9 is a view of an embodiment of the input and output parallel management table.

DESCRIPTION OF THE PREFERRED EMBODIMENT

Figure 7A:
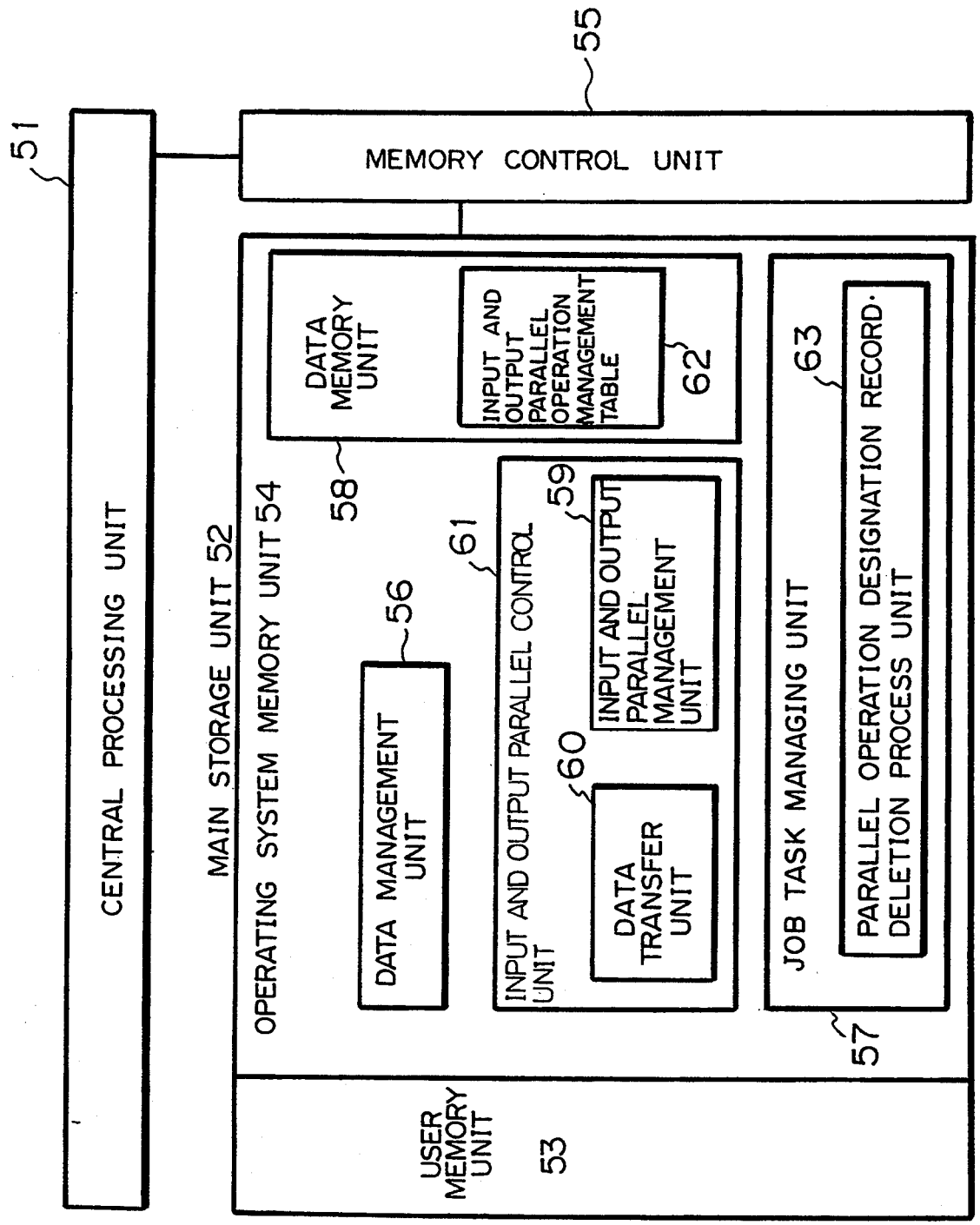
FIGS. 7A and 7B are block diagrams showing the principle of the present invention.
Figure 7B:
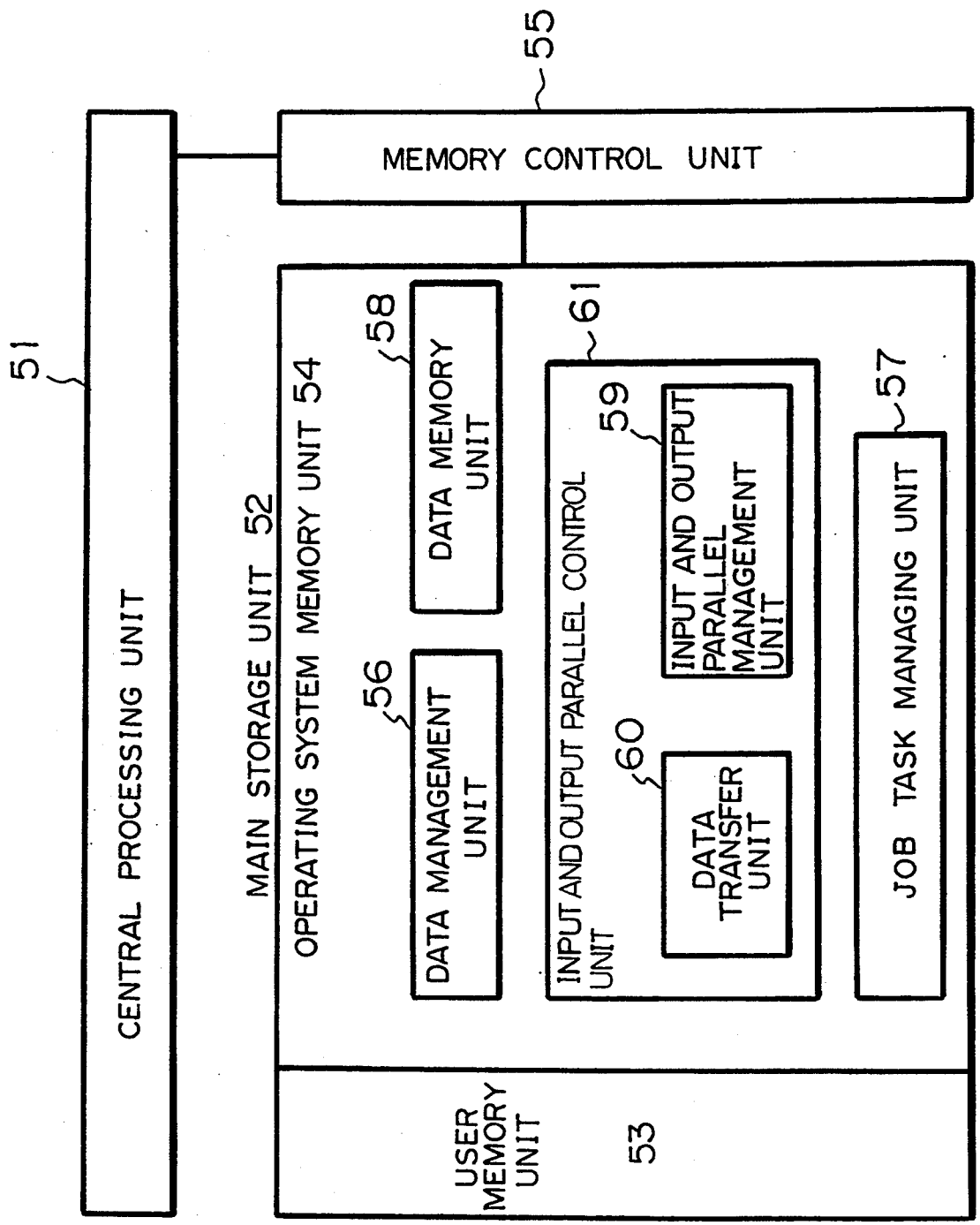

FIGS. 7A, 7B and 7C are block diagrams showing the principle of the present invention. FIG. 7A shows the principle of the first invention and FIG. 7B shows the principle of the second and third inventions. As shown in FIGS. 7A and 7B, the computer body comprises central processing unit 51, main storage unit 52 and memory control unit 55. User memory unit 53 and operating system memory unit 54 are located in main storage unit 52. As is commonly shown in FIGS. 7A and 7B, data management unit 56 for controlling data writing and data reading, job task managing unit 57 for managing an initiation, waiting operation and an end of the program, and data memory unit 58 used when data managing unit 56 and job task managing unit 57 execute a file output program and file input program are provided in operating system memory unit 54.

In FIGS. 7A and 7B input and output parallel management unit 59 exchange a control with data management unit 56 and manages whether a parallel process of an output program and an input program is performed for an object file, the output and input program being transmitted from data management unit 56 in accordance with a file open instruction, for example.

Data transfer unit 60 exchanges data with data management unit 56 based on a control of input and output parallel management unit 59 and transfers data written out from main storage unit apparatus 52 by a writing program to transfer data in a reading area for the reading program on main storage unit 52 without going through the external storage unit.

In FIG. 7A showing the principle of the first invention, input and output power management table 62 is provided in data memory unit 58 and parallel operation designating record.deletion process unit 63 is provided in job task management unit 57 in addition to the structure recited above.

Input and output parallel operation management table 62 stores a pair of names of a file output program and a file input program which use the same file, for respective files.

Parallel operation designation record.deletion process unit 63 performed a content change of input and output parallel management table 62, namely, a record and deletion of the names of output and input program which deal with as one pair, in accordance with a program other than the file output program and file input program or instruction by the user.

In the present invention, data management unit 56 notifies input and output parallel management unit 59 of a file name to be opened in accordance with a file output program, for example, a file open command from the writing program. Then input and output parallel management unit 59 judges that this file is an object of the input and output parallel process and the data transfer is made ready by a file open command from the file input program, for example, reading program. The data written out by writing out program is then transferred to the data area of the reading program in main storage unit 52 by data transfer unit 60 through data management unit 56 without waiting for a completion of the writing out program. The control such as initiation or waiting for writing out a program and reading a program as a task upon an operation of the parallel input and output conducted by job task management unit 57.

Therefore, the above-recited operation replaces the conventional operation in which the data is written out into an actual external storage unit such as a magnetic disc or magnetic tape and after a file formation is completed, an operation of a reading out of the data from the file is conducted. Data is directly transferred to a reading program in units of written out data such as units of a character and units of a record of a predetermined or variable length through a transfer from one portion of the main storage to another portion of the main storage without going through an external storage apparatus. Therefore, the main storage may be extended to the virtual storage or the writing and reading speed may be controlled by using more than one buffer or a reading and writing may be conducted in a batch or in a divided manner.

As shown in FIG. 7A designating the principle of the first invention, it becomes possible to change a content of input and output parallel management table 62 using parallel designation record(register).deletion process unit 63 in accordance with an instruction of a user or a different program and the file output program and file input program which are designated by the user or the different program can be processed in a parallel manner.

In FIG. 7B representing a principle of the second invention, input and output parallel management table 62 and parallel designation record(or register).deletion process unit 63 are not provided. The parallel process of the file output program and file input program previously registered in input and output parallel management unit 59 are conducted.

The principle of the third invention is shown in FIG. 7B in a similar manner to the second invention. In addition to the operation of the second invention, the third invention, further comprises job task management unit 57 which, upon an abnormal completion of one of the file output program and file input program, causes the other of the file output program and file input program to end as an abnormal stop. When the user designates the following program by the job control language, for example, and both file input and file output programs end in a normal manner, the following program is automatically initiated.

As is recited above, according to the present embodiment, it becomes possible to operate the file output program and the file input program for processing the file in a parallel manner without changing the conventional batch type data input program and data output program.

Figure 8:
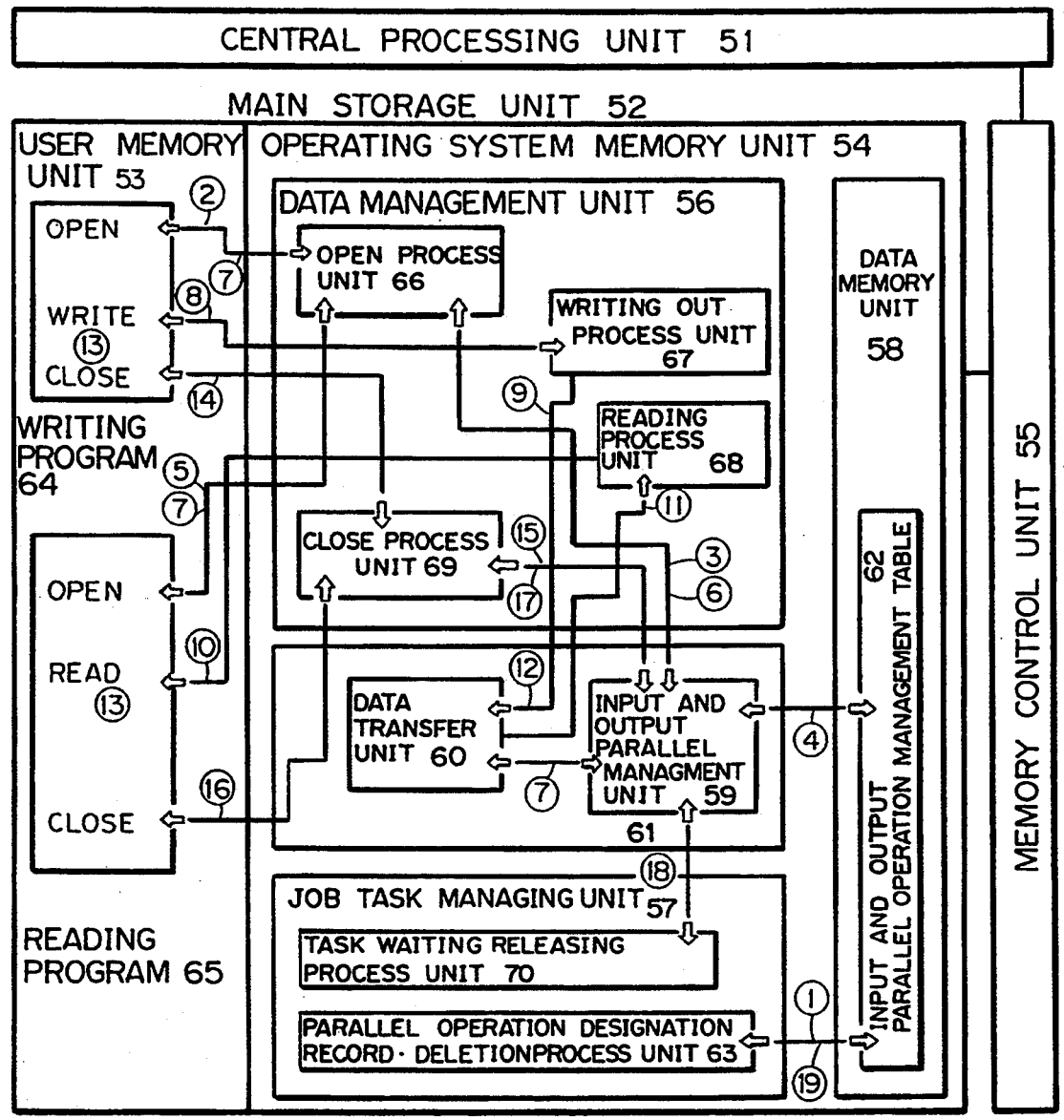
FIG. 8 is a block diagram showing an embodiment of the data input and output control system.

FIG. 8 shows a block diagram of an embodiment of the data input program and data output program control system according to the present invention. The main structure of this embodiment is similar to that shown in the principal block diagram shown in FIG. 7A, writing program 64 and reading program 65 are formed in user memory unit 53 of main storage apparatus 52.

Figure 1:
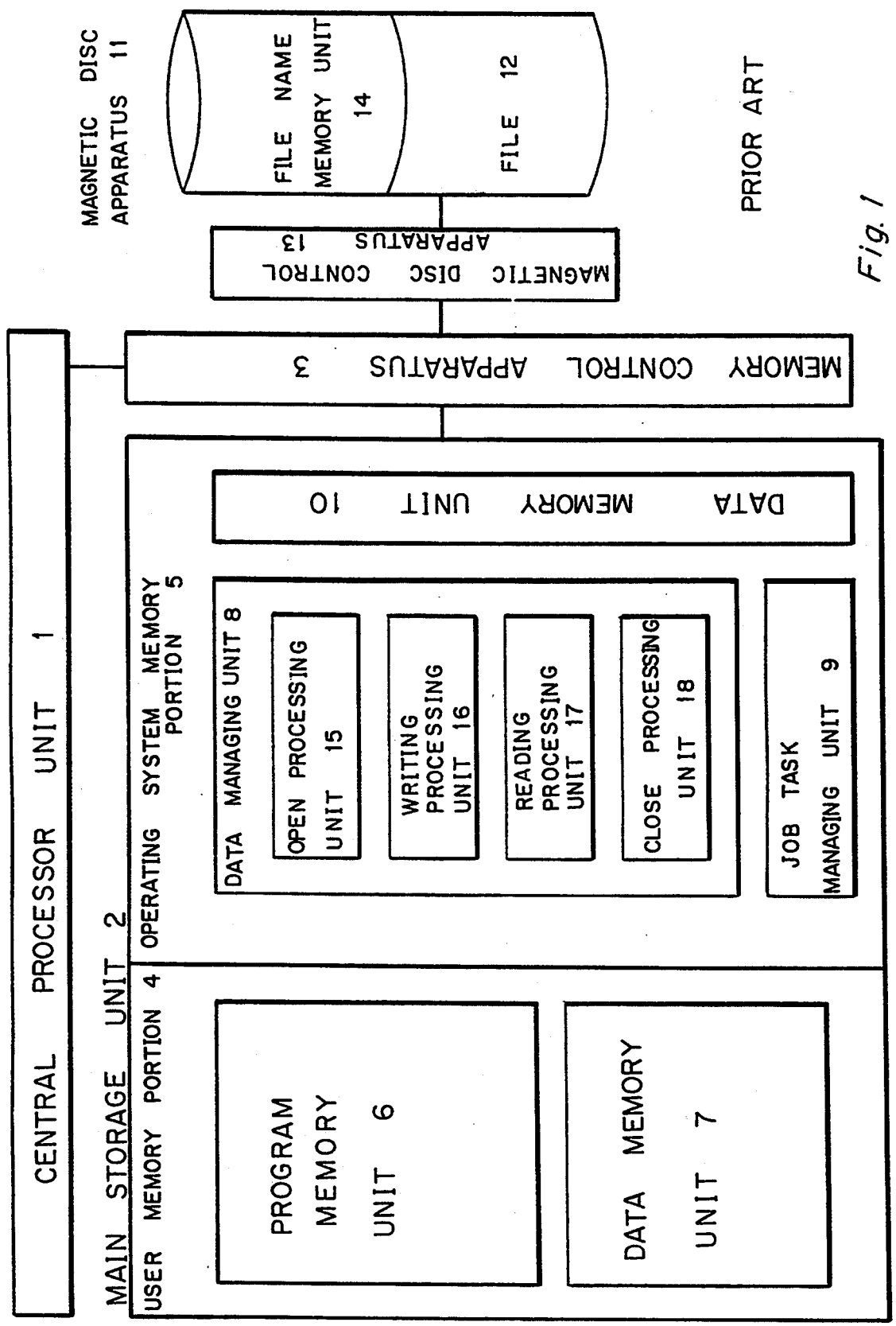
FIG. 1 is a block diagram of the first prior art of the data input and output control system.

Data management unit 56 in an operating system in a memory unit 54 comprises open process unit 66, writing out process unit 67, reading process unit 68 and close process unit 69 in a similar manner to the prior art shown in FIG. 1. Task waiting state.releasing process unit 70 controlling the task waiting state and its release is provided in job.task management unit 57 in addition to the previously recited parallel designation record.deletion process unit 63.

An operation of the embodiment of the data input and output control system is explained by FIG. 8.

The number of the following items correspond to the number (1) to (19) in FIG. 8.

(1) In order to execute a file output program for issuing a data output command and a file input program for issuing an input command of data in the file in a parallel manner, the name of the file which is a subject of the parallel operation is at first registered. Namely, when a user, for example, inputs the name of the file which is a subject of the parallel operation or an identification or identifier for identifying the name of the file, from a keyboard not shown in FIG. 8, parallel designation register.deletion process unit 63 in job task management unit 57 registers or changes the name of the file or the name of the program in input and output parallel management table 62 in data memory 58.

(2) Writing program 64 produced in user memory unit 53 by job.task management unit 57 of an operating system in accordance with a request of initiation by the user executes an initial process as a sequence previously programmed by the user and then issues an OPEN command.

Figure 2:
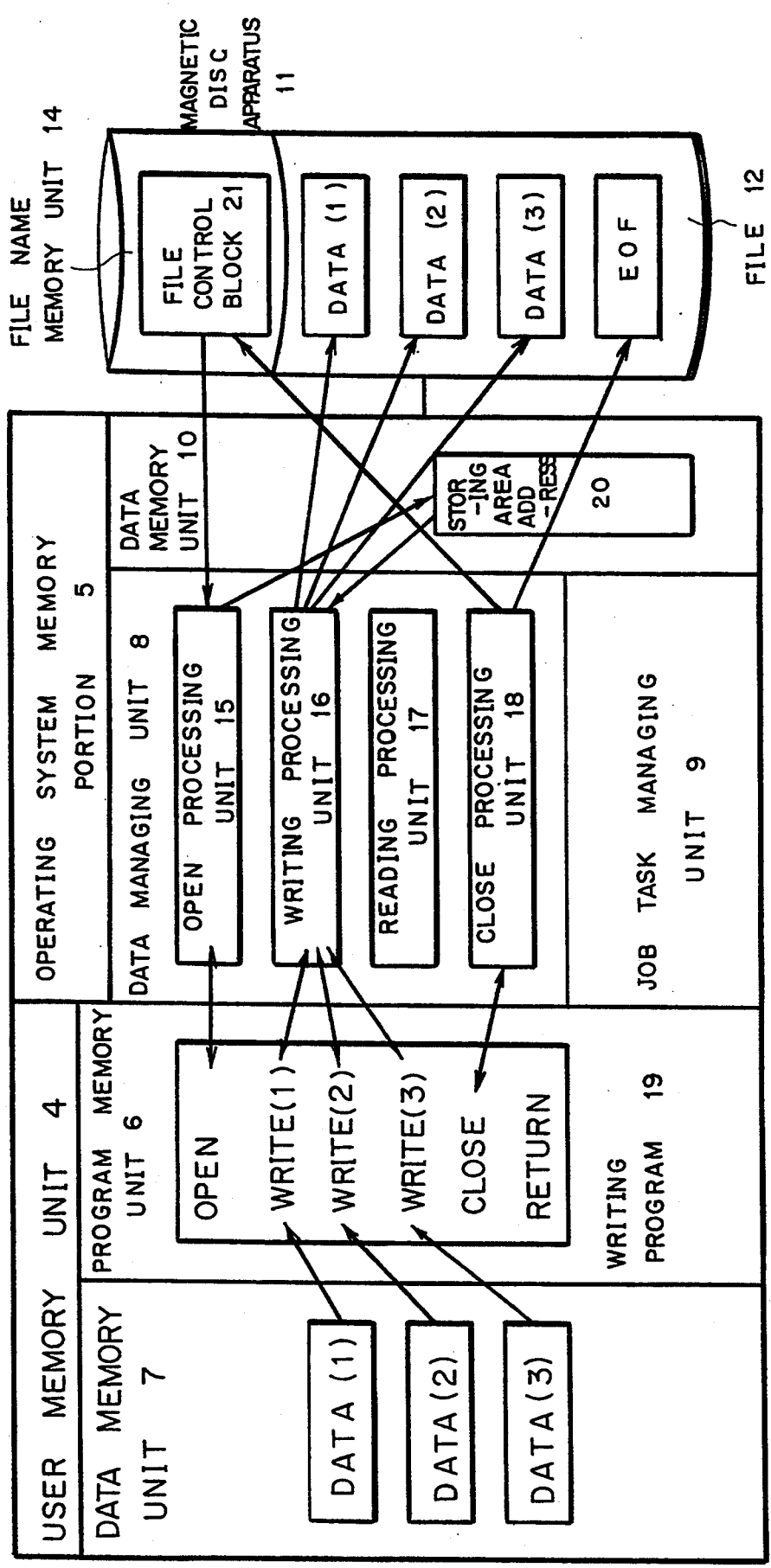
FIG. 2 is the operational drawing of a data writing in the first prior art.
Figure 3:
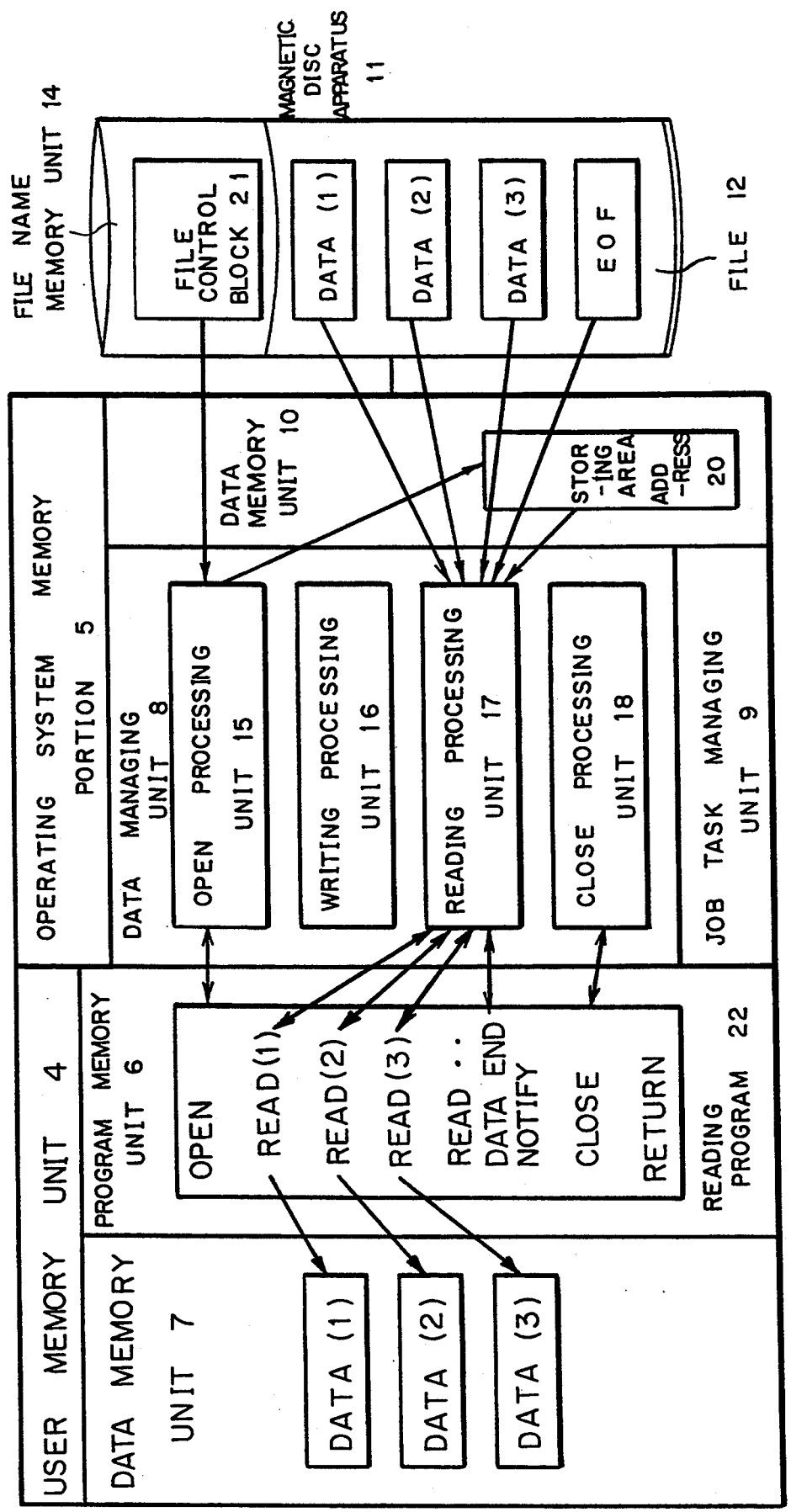
FIG. 3 is an operational drawing of a data reading in the first prior art.

The user program is formed so that it issues OPEN command, READ command, WRITE command or CLOSE command which are described in a conventional example shown in FIGS. 2 and 3, and is not changed for the present invention.

(3) An open process unit 66 of data management unit 56 of an operating system receives an OPEN command and then transfers the name of the designated files to input and output parallel management unit 59.

(4) Input and output parallel management unit 59 referred to input and output parallel management unit 62 and examines whether the designation of the name of the file which is a subject of the parallel operation is registered in advance.

The embodiment of input and output parallel management table 62 is shown in FIG. 9. As shown in FIG. 9, for respective ones of n parallel files which are now operating in a system, the name, state and the address and the length on the main storage unit of the writing program and reading program which use each of the respective files are registered. The state of the program will be explained in detail by referring to an operation flowchart of respective portions.

Input and output parallel management unit 59 examines input and output parallel management table 62 and as a result if it finds the name of the file, it sets the state of the writing program and the address and length of the writing data on the main storage and returns the control to open process unit 66. However, if the name of the file does not exist in input and output parallel management table 62, input and output parallel management unit 59 notifies open process unit 66 that the file does not exist and open process unit 66 performs the same open process as in the prior art, by using the actual input and output apparatus. The detail is explained by referring to FIG. 2.

If the name of the file is registered in input and output parallel management unit 62, open process unit 66 does not yet return the control to writing program 64. However, if the buffer is used, the method of returning the control to writing program 64 to start the writing and storing the write data in the buffer is possible.

(5) On the other hand, where reading program 65 is produced in a manner similar to (2) but is not always produced simultaneously with the writing program, and is produced in synchronization with the writing program, reading program 65 performs an initiation process and then issues an OPEN command.

(6) When open process unit 66 receives an OPEN command, it transfers the designated file name to input and output parallel management unit 59.

(7) Input and output parallel management unit 59 examines input and output parallel management table 62 to confirm that the file name exists and then sets the state of the reading program and the address of the reading data in the main storage unit in input and output parallel management table 62 and notifies open process unit 66 that the correspondence between the writing and reading is completed, thereby returning the control to open process unit 66. At this time, open process unit 66 returns the control to both writing and reading programs 64 and 65.

Therefore, either operation (2) or operation (5) may be performed earlier than the other.

(8) Writing program 64 prepares the data and issues a WRITE command.

(9) Writing process unit 67 notifies data transfer unit 60 that it has received the data but has not yet returned the control to writing program 64.

(10) Reading program 65 issues a READ command requesting the READ data.

(11) Reading process unit 68 having received the READ command and requests data transfer unit 60 to transfer the data.

(12) Data transfer unit 60 transfers the writing data obtained from the main storage by writing program 64 to the reading data area on the main storage for reading program 65. Thereafter, data transfer unit 60 notifies both process unit 67 for writing and process unit 68 for reading of a completion of the transfer.

(13) The control is returned to reading program 65 and writing program 64 to proceed to the next process. If there is a plurality of data, the above steps (8) to (13) are repeated.

(14) When writing program 64 has written all the data to be written, it issues a CLOSE command.

(15) Close process unit 69 receives this command and notifies input and output parallel management unit 59 of this command. Input and output parallel management unit 59 renews the writing program state in input and output parallel management table 62. Thereafter, input and output parallel management unit 59 returns the control to writing program 64 through close process unit 69.

(16) After writing program 64 issues a CLOSE command for a READ command issued by reading program 65, the data end (EOF) is notified. Therefore, when reading program 65 receives the data end or completes reading of all of the data to be read, it issues a CLOSE command.

(17) Close process unit 69 receives this command and notifies the receipt of a CLOSE command to input and output parallel management unit 59. Input and output parallel management unit 59 renews a state of reading program in input and output parallel management table 62 or deletes information such as the program name. Input and output parallel management unit 59 returns the control to reading program 65 through close process unit 69.

(18) While input and output parallel management unit 59 performs the above process, task waiting.releasing process unit 70 determines, based on the state of input and output parallel management table 62, whether the control may be returned to writing program 64 and reading program 65, which are the task. As a result, parallel management unit 59 performs a process of keeping the task waiting or releasing the waiting state of the task.

(19) As recited above, the execution of writing program 64 and reading program 65 is completed, parallel designation registraion.deletion process unit 63 deletes the file name and so on from input and output parallel management table 62 in accordance with the content inputted by the user through the keyboard as shown in (1).

If the user designates an automatic initiation of the following program by the job control language, job task management unit 57 automatically initiates the designated program, when writing and reading programs 64 and 65 are completed after issuing a RETURN command. In contrast, if writing program 64 does not reach the end in a normal manner because of an error of the program or the given data, or an execution stop instruction given by an operator, namely, if the process ends in an abnormal manner, reading program 65 is concurrently made to end in an abnormal manner. Conversely, where reading program 65 ends in an abnormal manner, writing program 64 is also made to end in an abnormal manner. Two programs which are in an input and output relation of the same file are executed concurrently as a result of the parallel control according to the present invention and in many cases it is expected that two programs end almost simultaneously.

Figure 4:
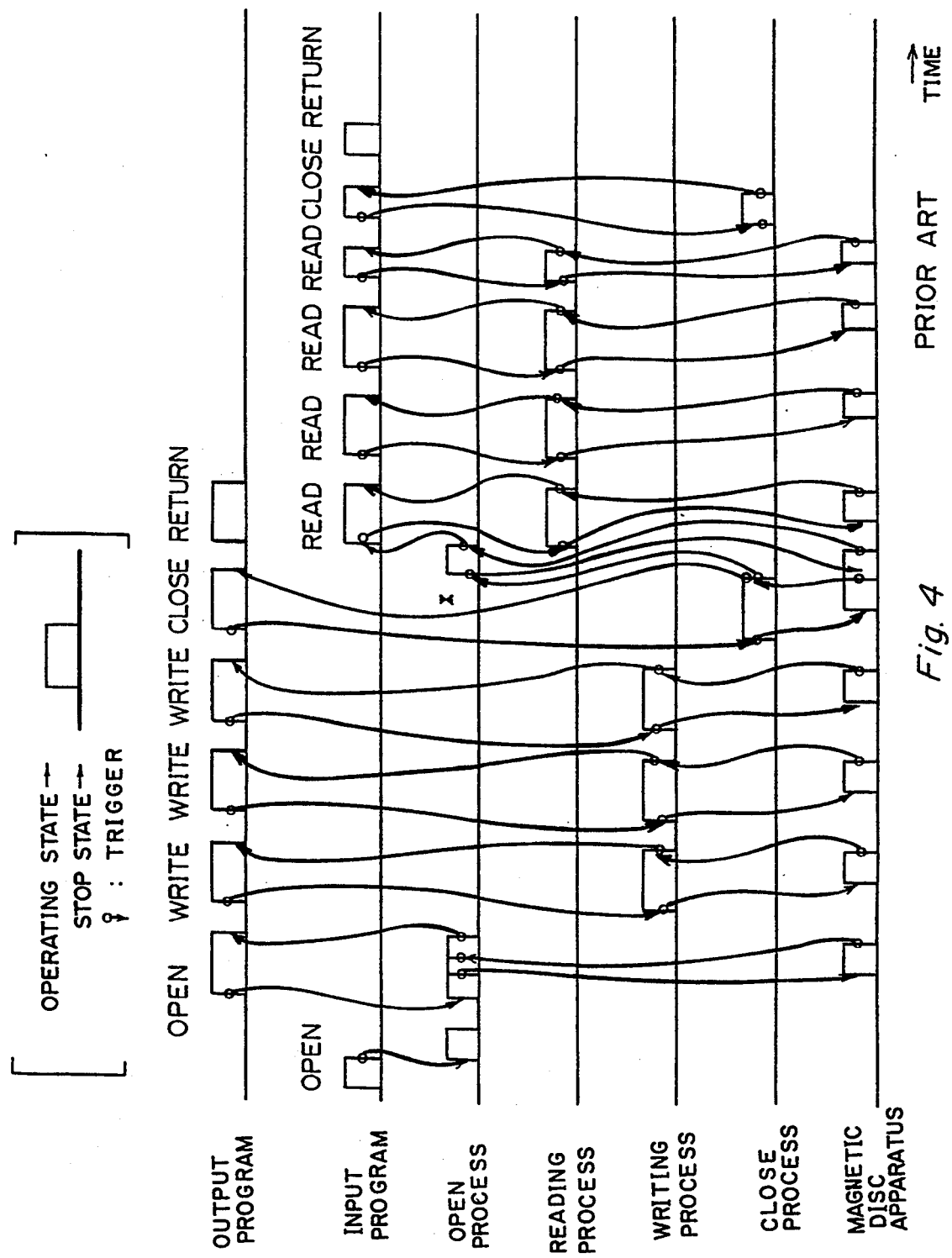
FIG. 4 is a timing chart of the data input and output in the first prior art.
Figure 5:
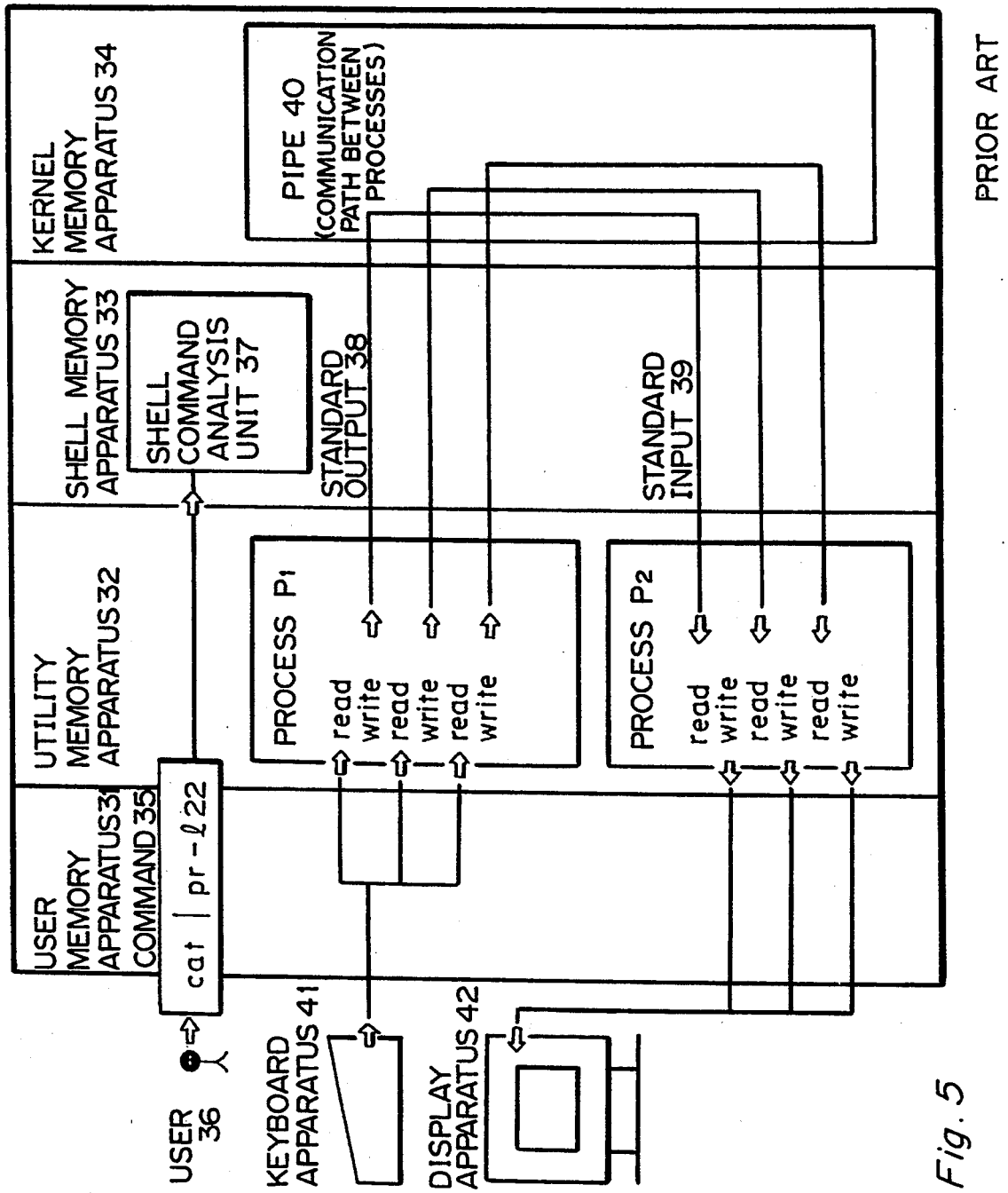
FIG. 5 is a block diagram of the second prior art of the data input and output control system.
Figure 6:
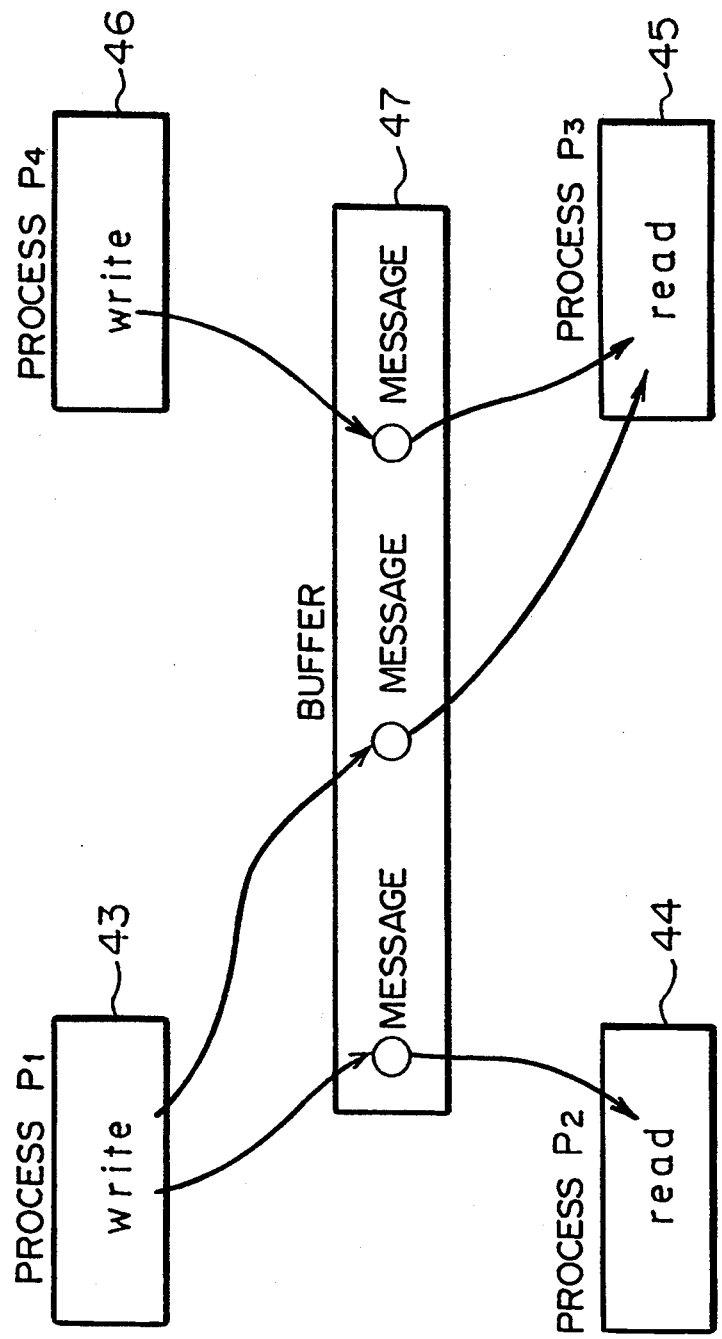
FIG. 6 is a view explaining the on-line system of the third prior art according to the data input and output control system.
Figure 10:
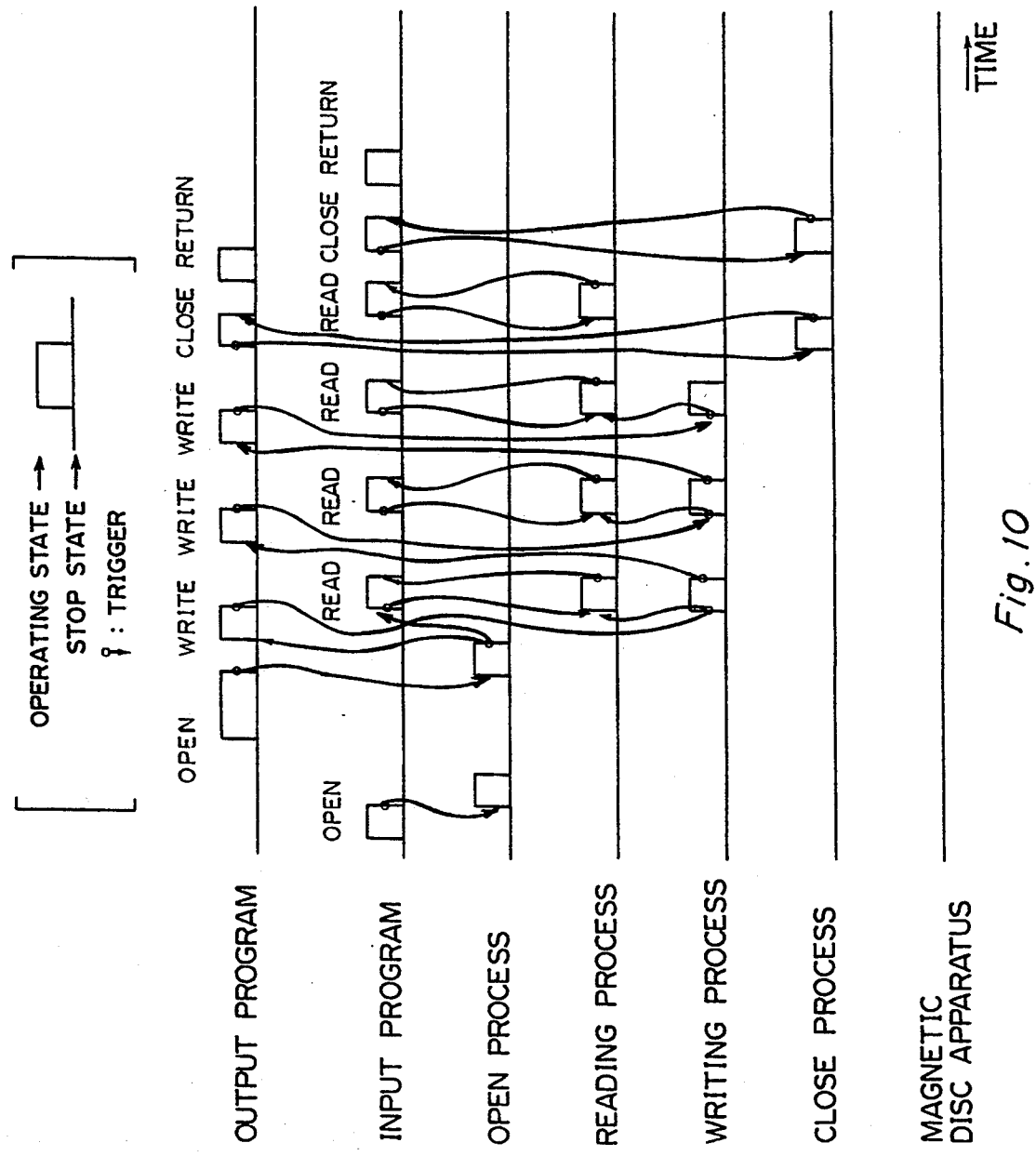
FIG. 10 is an operational time chart of the data input and output embodiment according to the present invention.

FIG. 10 shows a timing chart of an operation as compared with the prior art shown in FIG. 4. From FIG. 10 the actual timing of the parallel process and the decrease in the necessary time period become clear.

Figure 11A:
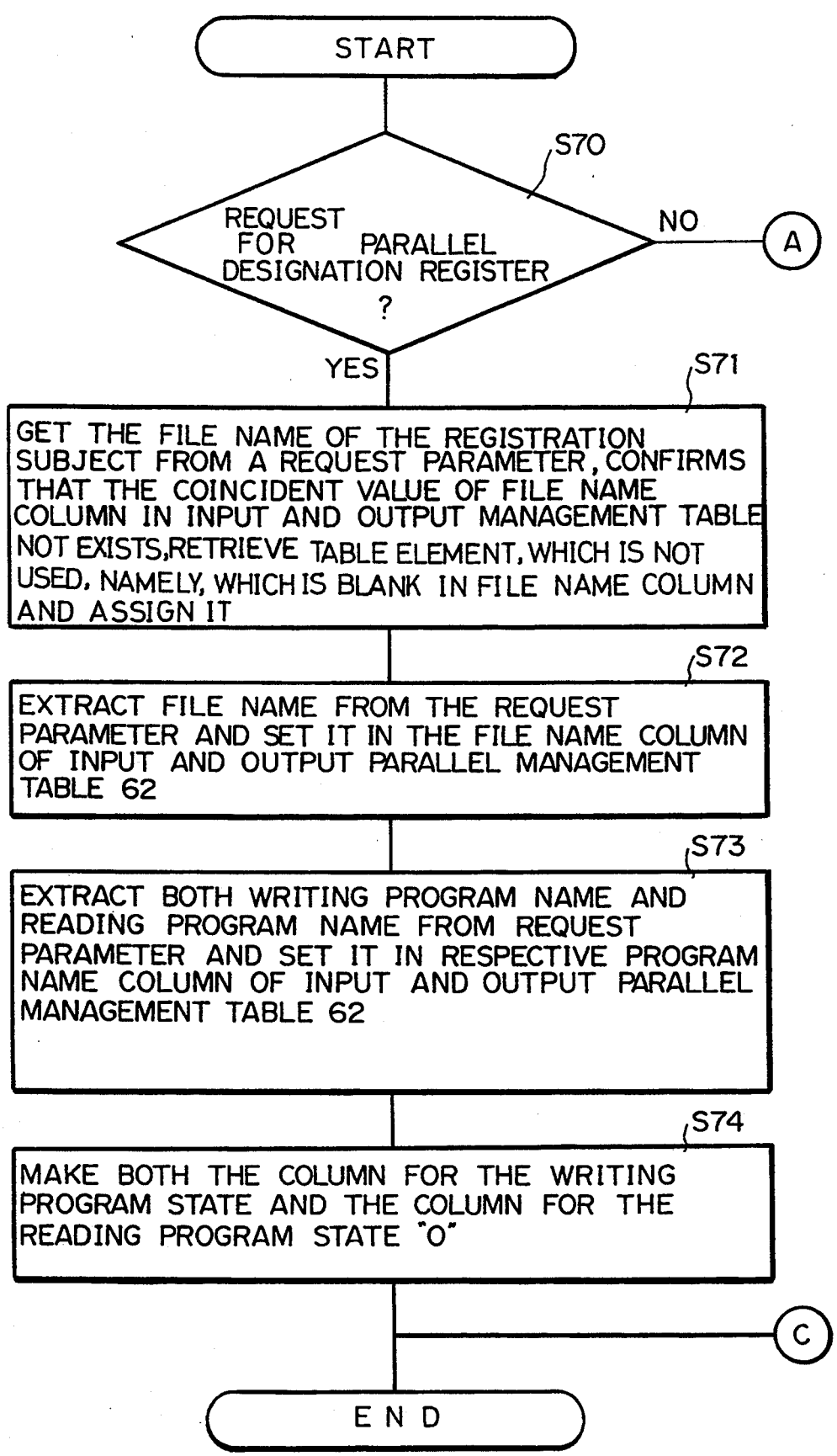
FIGS. 11A, 11B, and 11C are detailed flowcharts of the parallel designation register.deletion process.
Figure 11B:
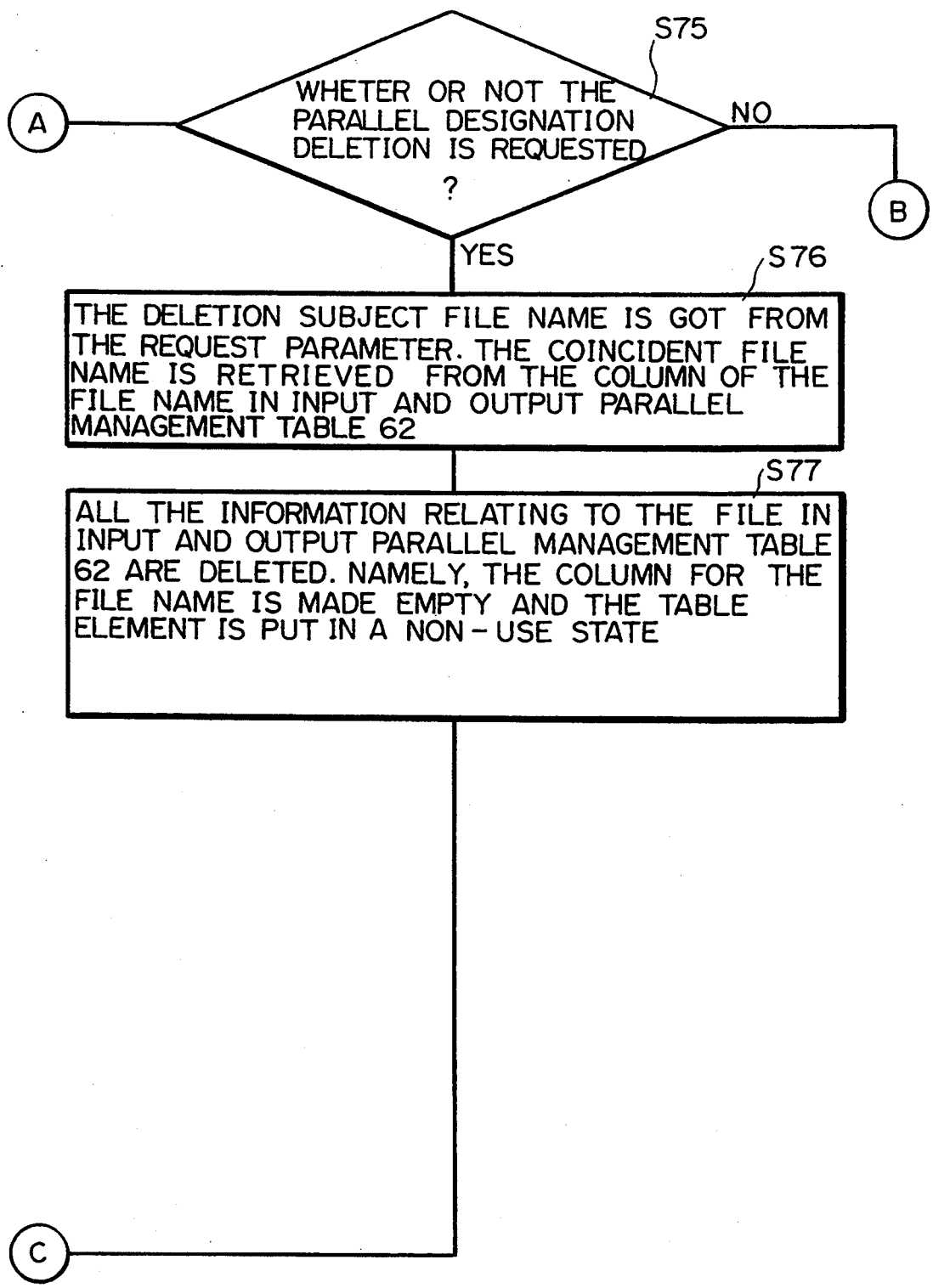
Figure 11C:
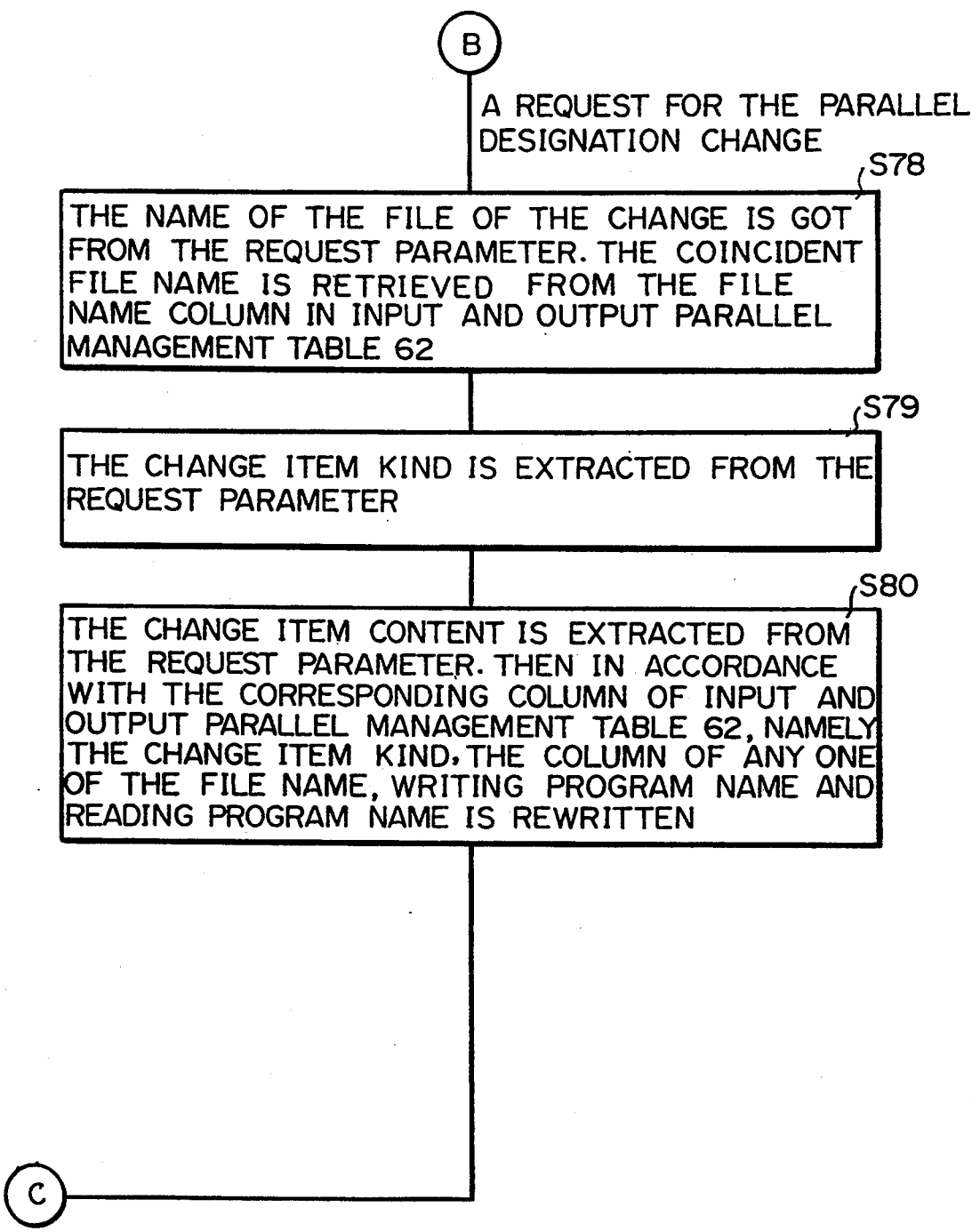

FIGS. 11A to 11C show detailed flowcharts of the parallel designation register.deletion process. The process corresponds to (1) and (19) in FIG. 8. When the process starts,. S70 judges whether or not the parallel designation register is requested. In case of the registration request, in S71, the file name of the registration subject is got from a request parameter, namely, information transmitted when the user program issues a macro command. Then, it is confirmed that the same or coincident name does not exist in the column for the file name in input and output parallel management table 62 and the table element which is not used is assigned to the file name.

Next, in S72, the file name is extracted from the request parameter and is set in the file name column of input and output parallel management table 62. In S73, both writing program name and reading program name are extracted and are set in respective program name columns of input and output parallel management table 62. Thereafter, in S74, both the column for the writing program state and the column for the reading program state are made "0", namely, before-open, thereby ending the process.

If S70 judges that the process is not a registration request, S75 judges whether or not the parallel designation deletion is requested. If it is, the deletion subject file name is got from the request parameter in S76. The coincident file name is retrieved from the column of the file name in input and output parallel management table 62. Next, in S77, all the information relating to the file in input and output parallel management table 62 are deleted. Namely, in S77, the column for the file name is made empty and the table element is put in a non-use state, thereby ending the process.

Where S70 determines that the registration is not requested and S75 determines that the deletion is not requested, the process is a request for parallel designation change. In S78, the name of the file which is the subject of the change is got from the request parameter in S78 and the coincident file name is retrieved from the file name column in input and output parallel management table 62. Next, in S79, the change item kind is extracted from the request parameter and in S80, the change item content is extracted from the request parameter. Then, the corresponding column of input and output parallel management table 62, namely, the column of any one of the file name, writing program name and reading program name is rewritten in accordance with the change item kind, thereby ending the process.

Figure 12:
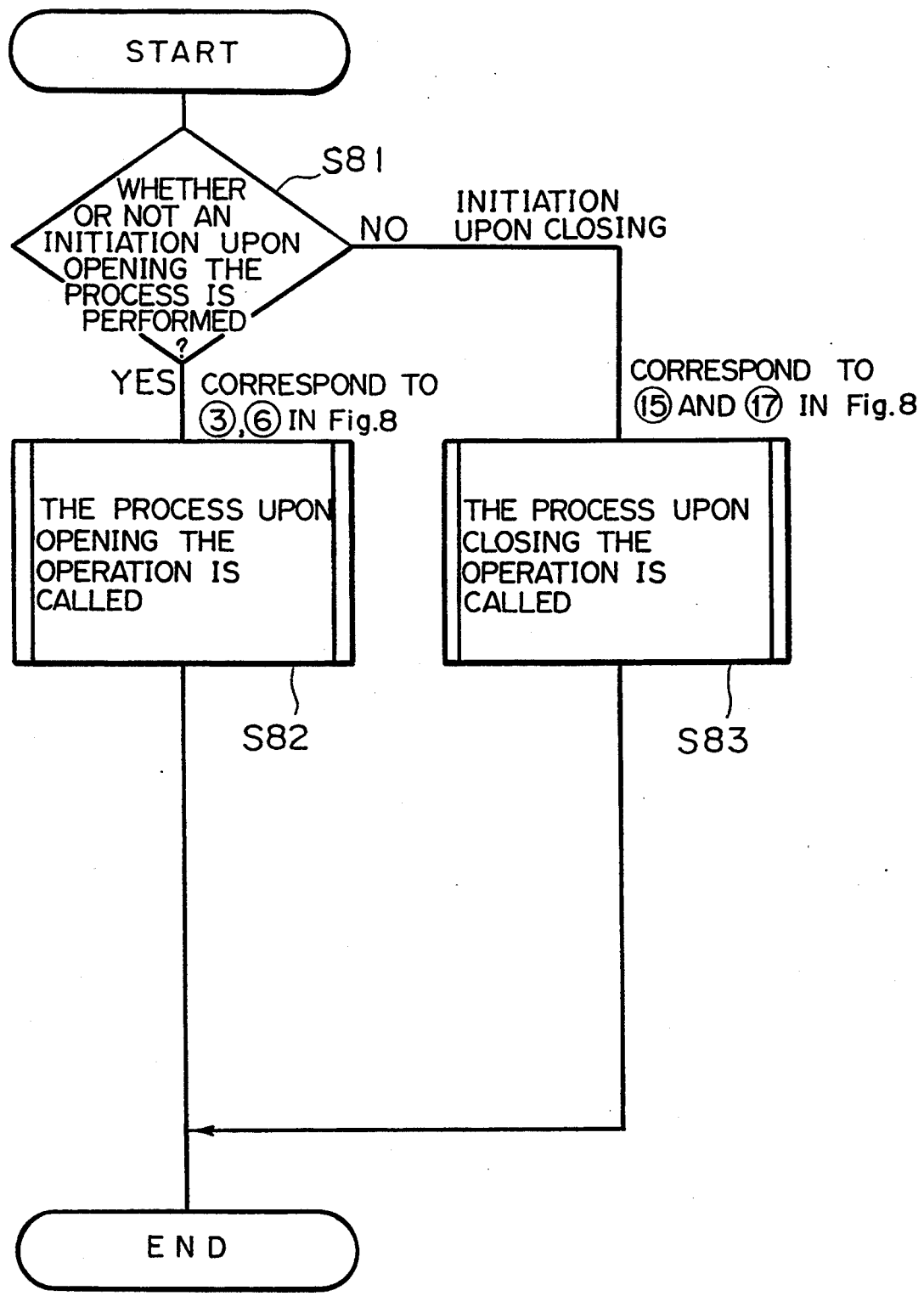
FIG. 12 is an operational flowchart of the input and output parallel management unit.

FIG. 12 is an operation flowchart of input and output parallel management unit 59. When the process starts, S81 judges whether or not an initiation is performed upon starting the process. In a case of an initiation upon opening the process, the process corresponds to (3) and (6) in FIG. 8, and S82 calls the process upon opening the operation, thereby ending the process. Where the process is not that upon opening the operation, it corresponds to an initiation upon closing the operation. Namely, it is made to correspond to (15) and (17) in FIG. 8 and S83 calls the process upon closing the operation, thereby ending the process.

Figure 13A:
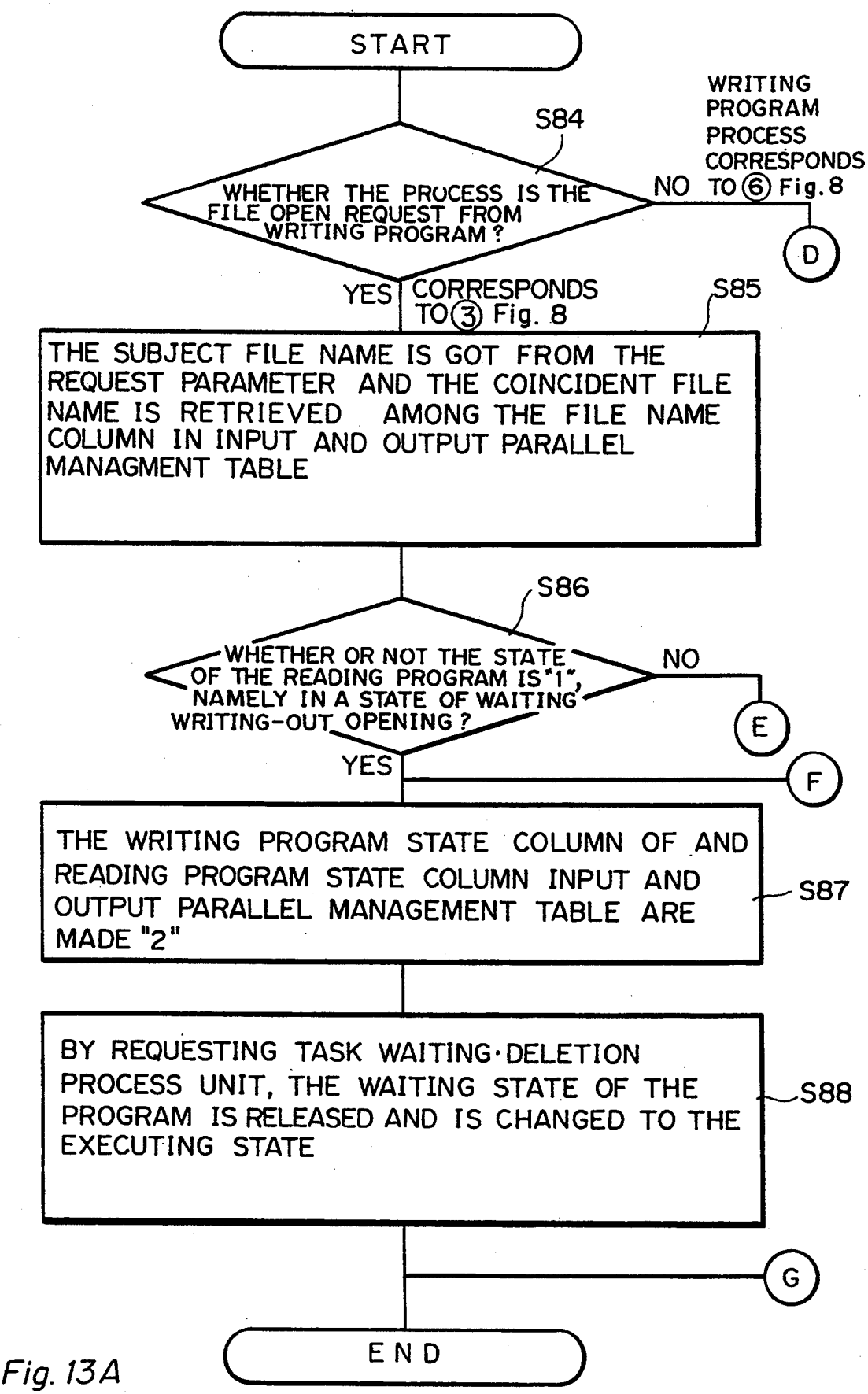
FIGS. 13A, 13B and 13C are detailed flowcharts of an open process.
Figure 13B:
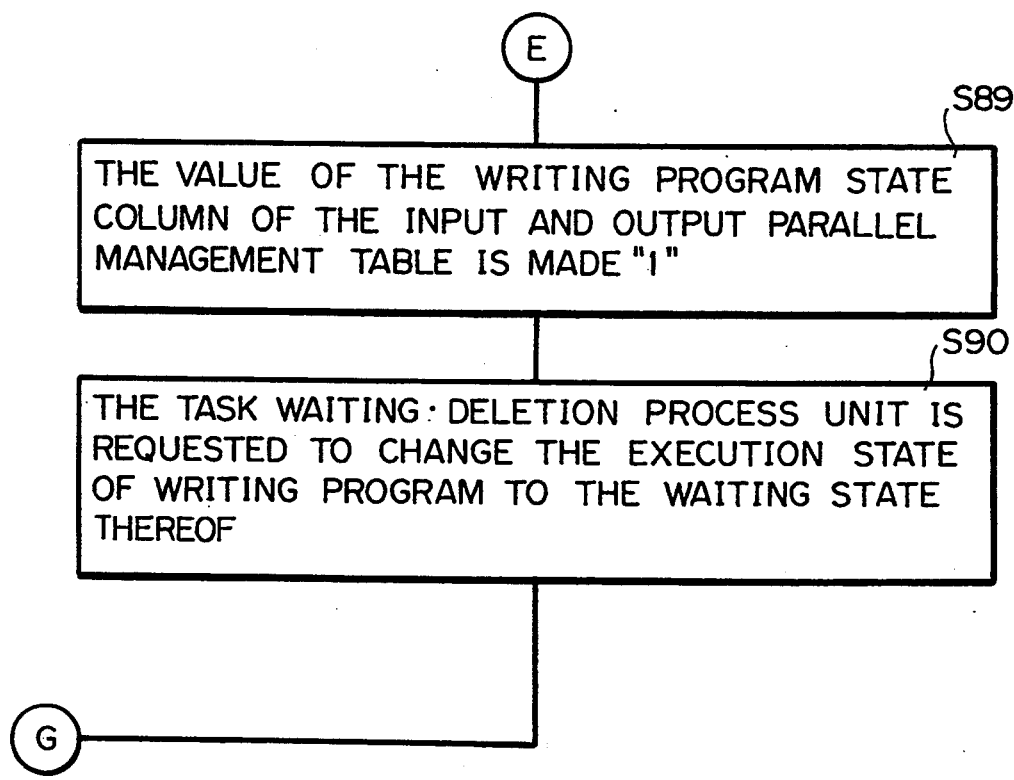
Figure 13C:
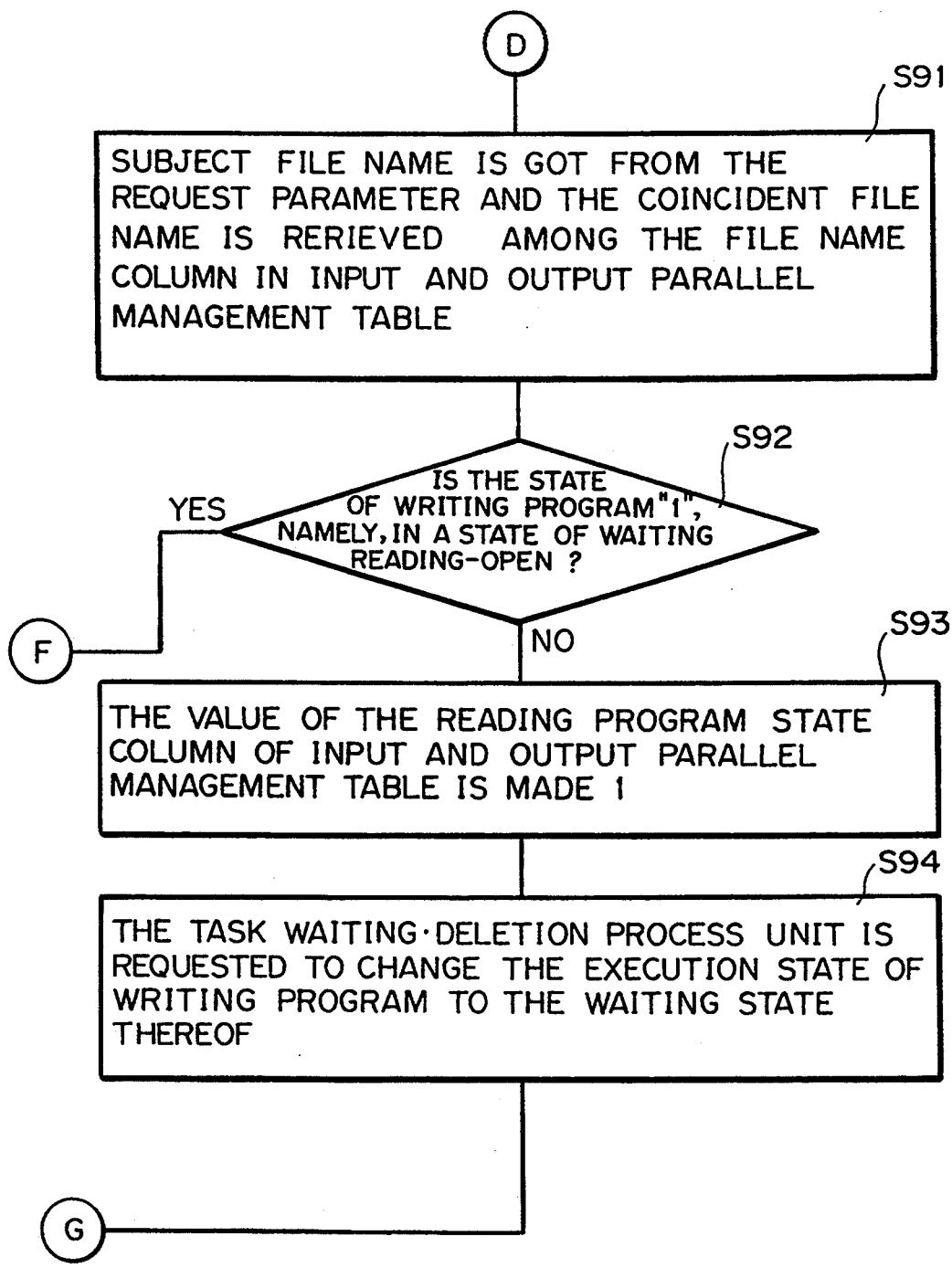

The detailed flowchart of this opening process is shown in FIGS. 13A to 13C. When the process in FIG. 13A starts, S84 determines whether or not the process is a file open request from writing program 64 and in a case of the request from writing program 64, namely, where the process corresponds to (3) in FIG. 8, the subject file name is got from the request parameter in S85 and the coincident file name value is retrieved from among the file name columns in input and output parallel management table 62.

Next, it is judged whether or not the state of the reading program corresponding to the retrieved file name is "1", namely, whether or not the program is in a state of waiting for reading opening. The writing open waiting operation designates the state in which the file has already been opened by the reading program. In the case of the writing open waiting, S87 makes the writing program state column of input and output parallel management table 62 "2", namely, before-writing and makes the reading program state column of input and output parallel management table 62 "2", namely, writing waiting, thereby completing the preparation of the data transfer. Sequentially, in S88, by requesting task waiting.deletion process unit 70, the waiting state of the program, namely, the waiting state of the reading program, or the state in which the process is not got by the CPU and is not executed, is deleted and is changed to the executing state, namely, the state in which the process is got and executed by the CPU, thereby ending the process.

Where the reading program state is not in waiting an opening of the writing in S86, namely, where the process is before the file-open, the process steps to S89 in which the value of the writing program state column of input and output parallel management table 62 is made "1", namely, made in reading open waiting state, and the task waiting.deletion process unit 70 is requested to change the execution state of the writing program 64 to the waiting state thereof in S90, thereby ending the process.

Where the process is not a request from writing program 64 in S84, the process corresponds to the request from reading program 65, namely, (6) in FIG. 8 and in S91, the subject file name is retrieved from input and output parallel management table 62 in a similar manner to S85. Sequentially, S92 judges whether or not writing program state is "1", namely, in a reading open waiting state and in case of the reading open waiting state, S87 and S88 are executed as preparation of the data transfer, thereby ending the process.

Where the state of the writing program is not reading open waiting in S92, the file is not yet opened by the writing program. Thus, in S93, the value of the reading program waiting state column is made "1", namely, writing-open waiting in a similar manner to S89 and S90. In S94, the task waiting.deletion process unit 70 is requested to change the process to the reading program waiting state in S94, thereby ending the process.

Figure 14A:
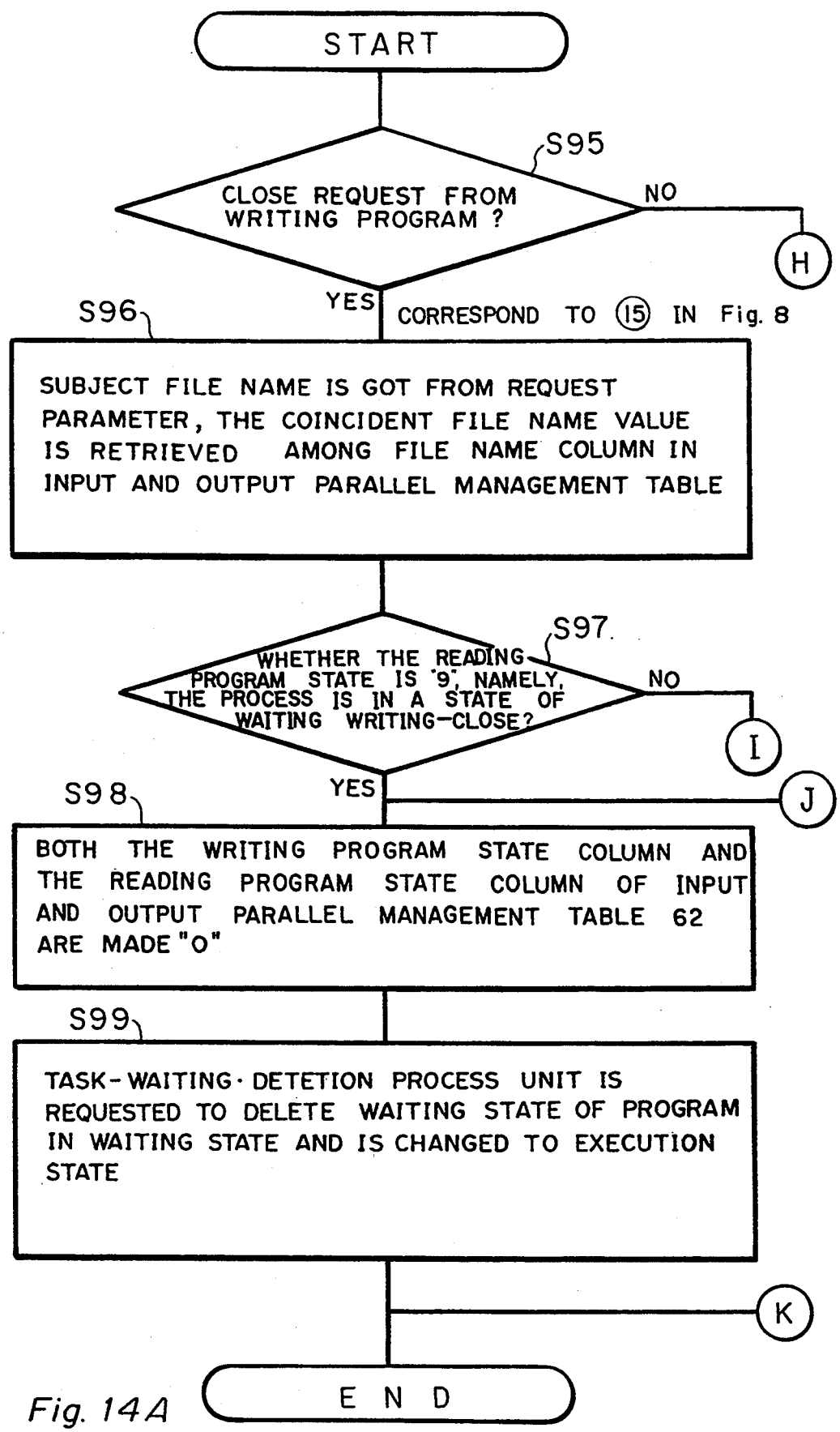
FIGS. 14A, 14B and 14C are detailed flowcharts of a closed process.
Figure 14B:
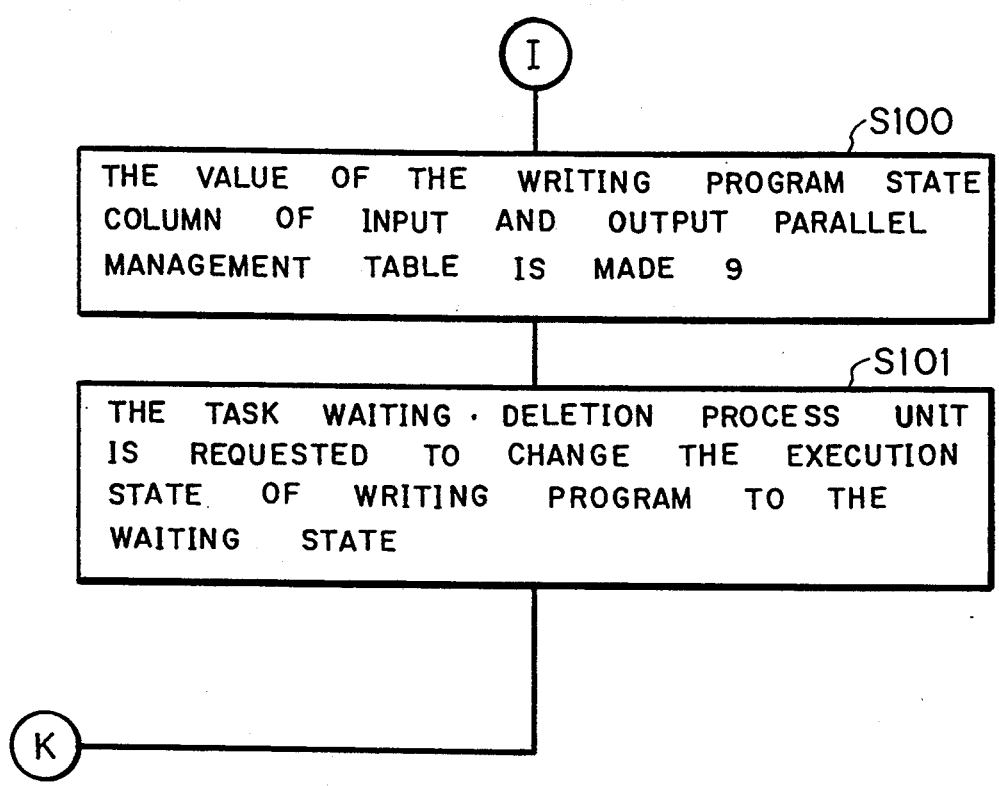
Figure 14C:
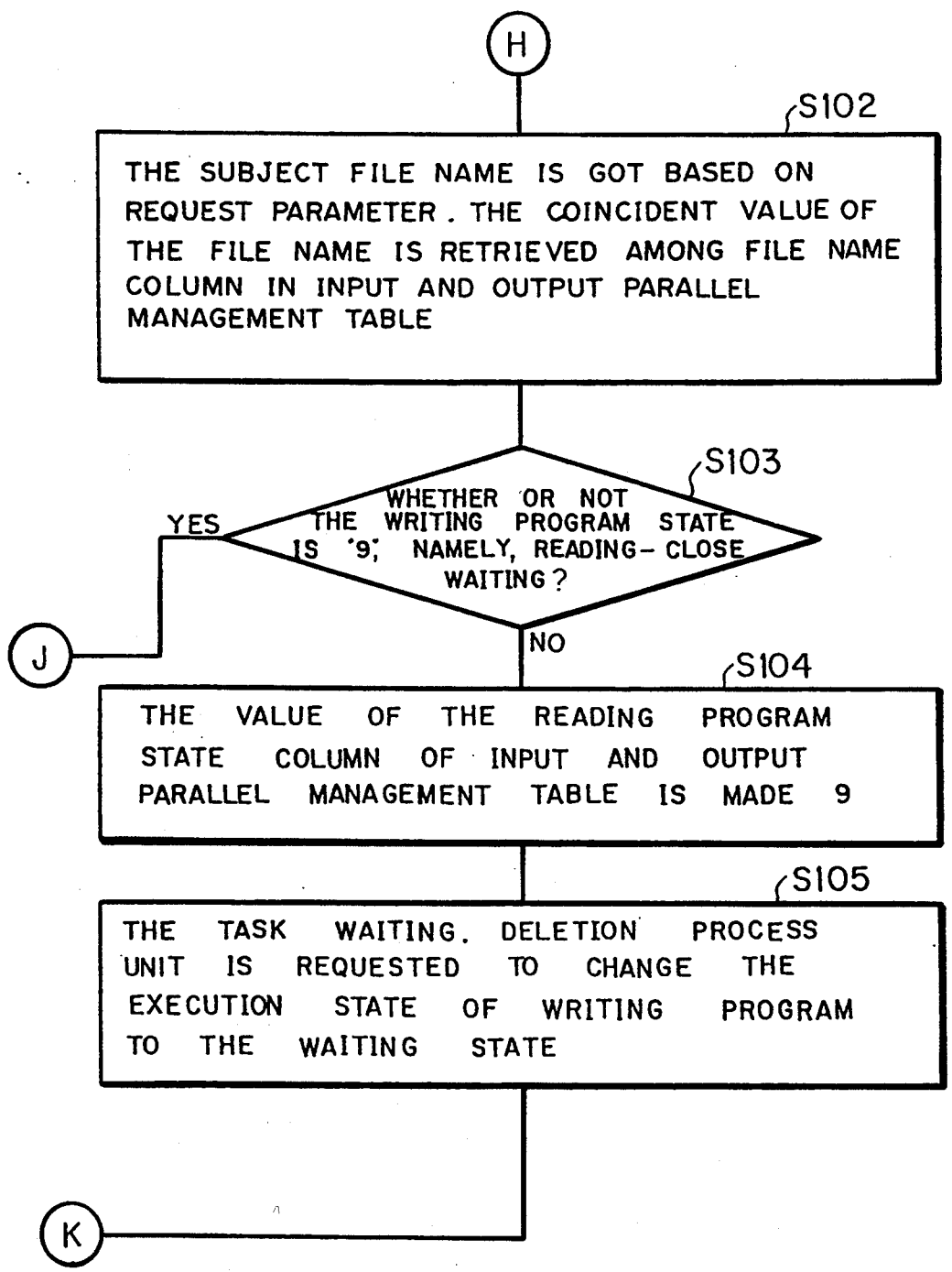

FIGS. 14A to 14C show detailed flowcharts of the closing process. The flowchart is similar to the opening process shown in FIGS. 13A to 13C. When the process starts, at first S95 judges which program the request is issued from, in a similar manner to S84 in FIG. 13A. In case of the request from the writing program 64, the process corresponds to (15) in FIG. 8 and the file name column of input and output parallel management table 62 is retrieved to in S96 in a similar manner to S85.

Next, S97 determines whether or not the reading program state is "9", namely, the process is in a state of waiting for a writing-close operation. If it is waiting for a writing-close operation, a file close from the reading program 65 side is already completed. Both the writing program state column and the reading program state column of input and output parallel management table 62 are made "0", namely, before-opening in S98. In S99, the program in a waiting state, namely, reading program 65 is requested to be changed to the execution state by task waiting.deletion process 70, thereby ending the process.

In S97, if the process is not in a state of waiting for a writing-close, the close of the file is not yet performed from the reading program side and in S100 the value of the writing program state column in the input and output parallel management table 62 is made "9", namely, in the reading close waiting state. In S101, the task waiting.deletion process unit 70 is requested to change the execution state of writing program 64 to the waiting state thereof, thereby ending the process.

When S95, the process is made to correspond to the close request from reading programs 65, namely, to (17) in FIG. 8, in S102, the file name column of input and output parallel management table 62 is retrieved to in a similar manner to S96 and S103 judges whether or not the writing program state is "9", namely, waiting for a reading close. In a case of reading close waiting state, this means that data transmission is completed, thereby ending the process after executing S98 and S99. In S103, if the state is not reading close waiting, this means that the file close is not yet issued by the writing program side and in S104, the value of the reading program state column of input and output parallel management table 62 is made "9", namely, writing close waiting. In S105, task waiting.deletion process unit 70 is requested to change the execution state of reading program 65 to the waiting state thereof in S105, thereby ending the process.

Figure 15A:
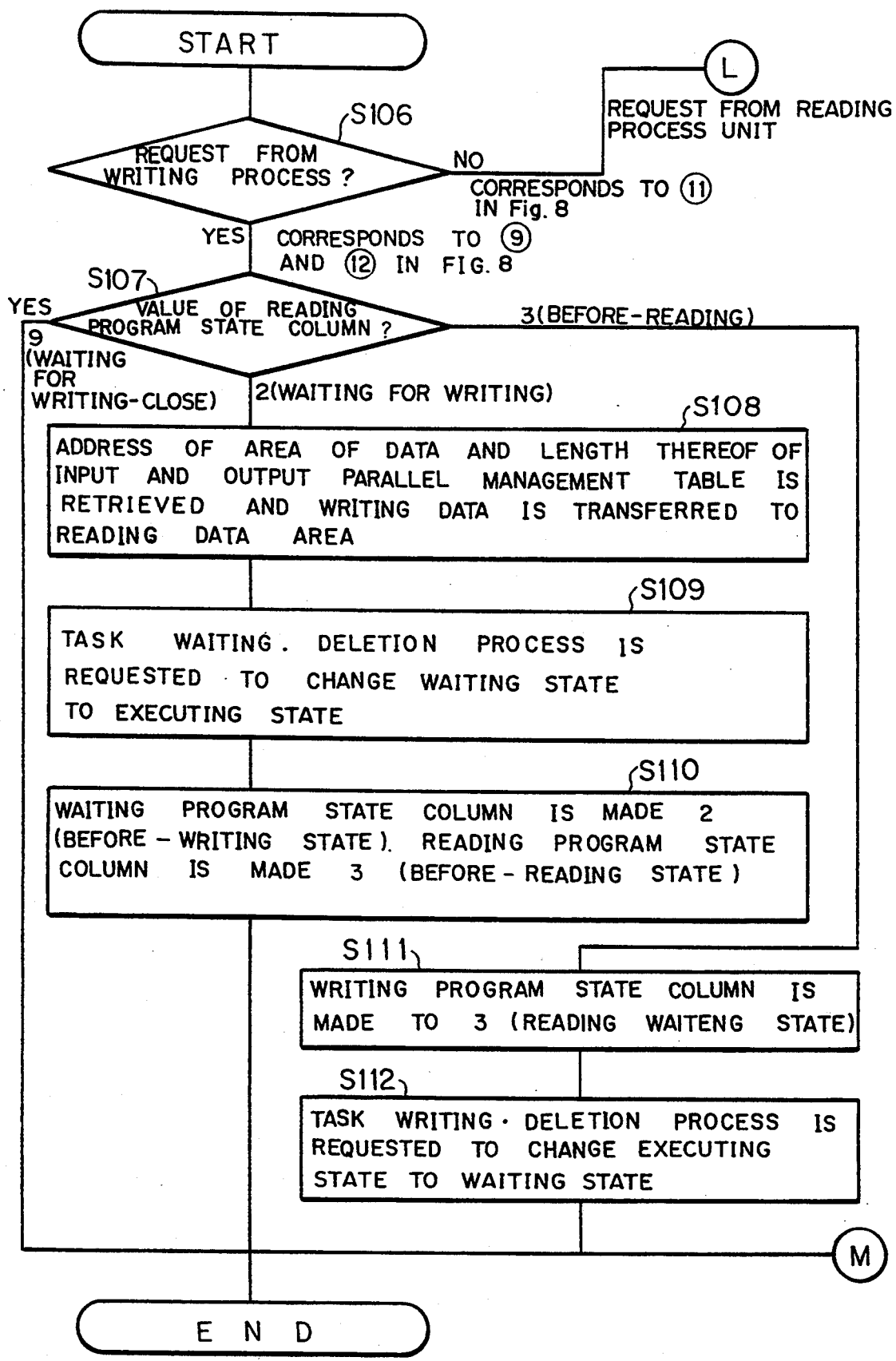
FIGS. 15A and 15B are detailed flowcharts of the data transfer process.
Figure 15B:
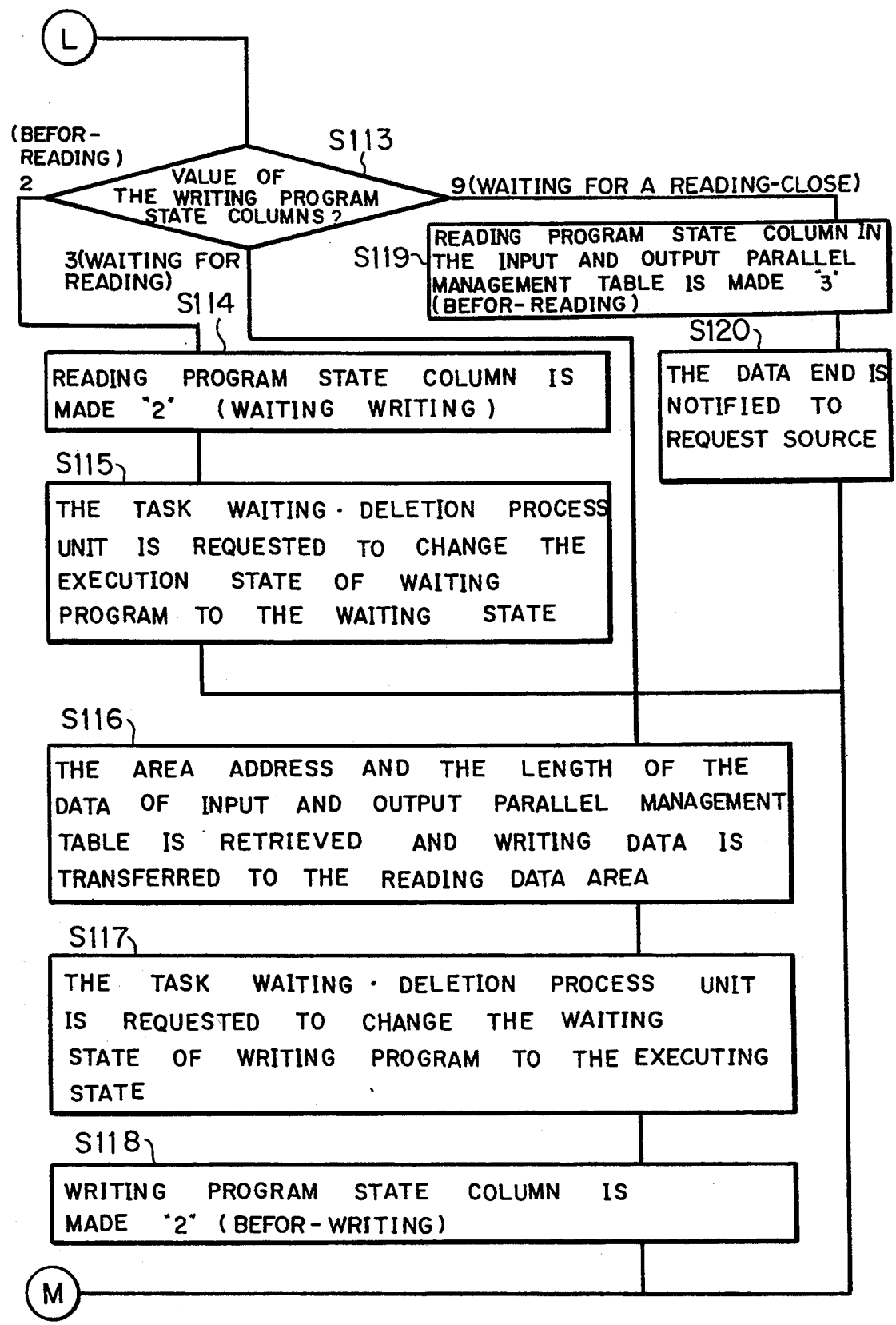

FIGS. 15A and 15B show detailed flowcharts of the data transfer process when the data transfer process corresponding to (12) of FIG. 8 starts. S106 judges whether or not the process is the transfer request from writing process unit 67. If it is, namely, if it corresponds to (9) and (12) in FIG. 8, S107 determines the value of the reading program state column of input and output parallel management table 62. If the value of the reading program state column is "2", namely, if the process writing is waiting, this means that the reading program side is ready to receive the data. In S108, to obtain the address of data area and the length thereof, input and output parallel management table 62 is referred to and the writing data is transferred to the reading data area. Sequentially, S109 requests task waiting.deletion process unit 70 to change the state of waiting reading program 65 to the state of executing reading program 65. In S110, the writing program state column of input and output parallel management table 62 is made "2", namely, before-writing and the reading program state column is made "3", namely, in the before-reading state, thereby completing the process.

If S107 makes the reading program state column "3", namely, to a before-reading state, the reading program is not ready to receive the transfer data. Thus, S111 makes the writing program state column "3", namely, to a reading waiting state. Then, S112 requests task waiting.deletion process unit 70 to change the state of executing writing program 64 to a state of waiting for writing program 64, thereby completing the process.

In S107, the reading program state column is "9". Namely, in a waiting state a writing close, reading program side completes reading all the data to be read, thereby closing the file and waiting for a file to close from the writing program side. Therefore, the data transfer request from writing close unit 67 is disregarded and nothing is executed, thereby ending the process.

When S106 judges the process to be the request from reading process unit 68, namely, to correspond to (11) in FIG. 8, S113 determines the value of the writing program state column in input ant output parallel management table 62. When the value is "2", namely, before-writing, this corresponds to a state in which writing program has not written the data into the file and thus, the reading program state column is made "2", namely, before-writing in S114 and task waiting.deletion processing unit 70 is requested to change an execution state of reading program 65 to the writing state, thereby completing the process.

If S113 judges that the writing program state column is "3", namely, in a state of waiting for the reading, this means that the completion of the operation for the data transfer, and S116 refers to the area address and the length of the data of input and output parallel management table 62 and writing data is transferred to the reading area. Thereafter, S117 requests the task waiting.deletion process unit 70 to change the state of waiting for writing process 64 to a state of executing the program and S118 makes the writing program state column of input and output parallel management table 62 "2", namely, before-writing, thereby ending the process.

When the writing program state column is "9", namely, in a state of waiting for a reading close in S113, this means that all of the data to be written is already expired from the writing program side, and in S119, the reading program state column of the input and output parallel management table 62 is made "3", namely, before-reading, and in S120 the data end is notified to reading process unit 68, which is the source of requesting the transfer, thereby ending the process.

Figure 16A:
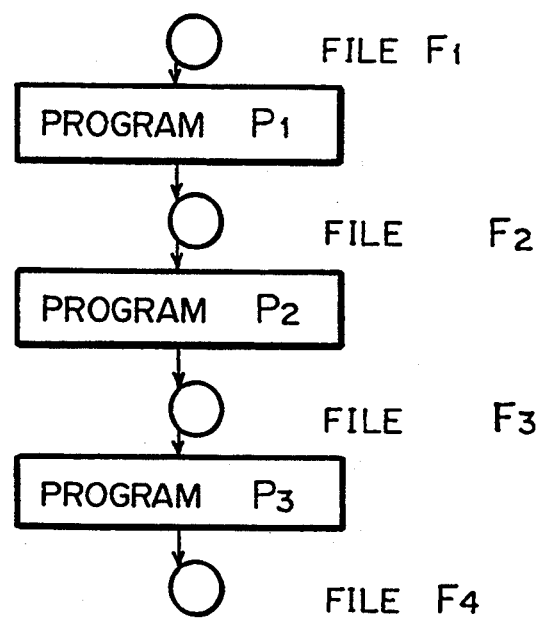
FIG. 16A is a drawing showing an example in which the data input and output control system of the present invention is applied to three programs.
Figure 16B:
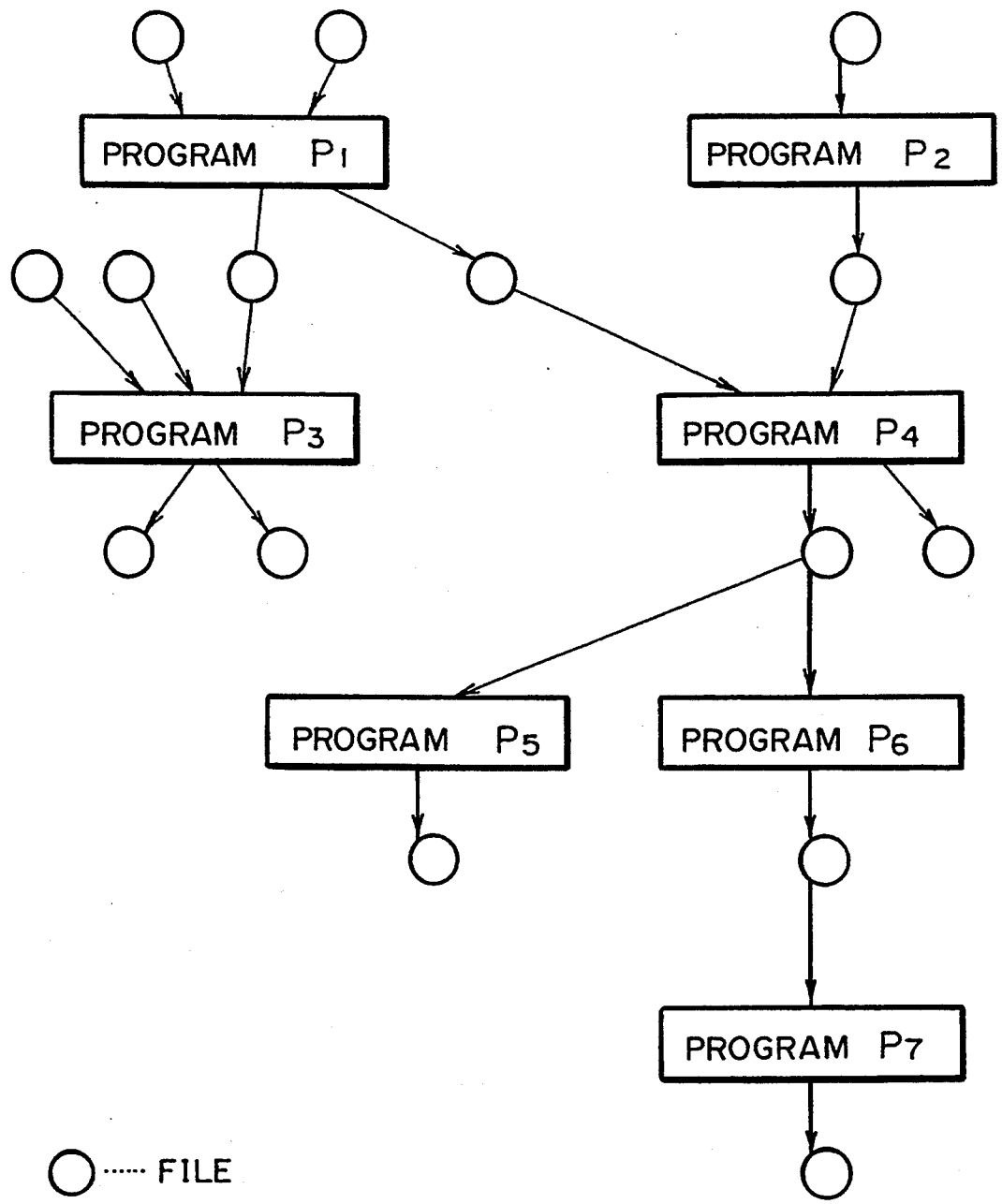
FIG. 16B is a drawing showing an example in which many programs are applied to the data input and output control system of the present invention.

As explained above, data input and output between two programs comprising one writing program and one reading program is recited the control method of the present invention can be applied among more than three programs. FIG. 16A shows an example in which the present control method is applied to three programs and FIG. 16B shows an example in which the present control method is applied to many programs. As shown in FIG. 16A, while program P2 receives the data from file F2 which is outputted from program P1, program P2 simultaneously outputs the data to file F3, in which program P3 is inputted. Namely, a parallel processing is conducted. FIG. 16B shows a parallel processing of the data input and output which is performed among many programs.

Generally speaking, a sequence relation of the batch program for two programs is determined based on the data output (file formation) to the file to be used and the data input (file use) from the file. Generally speaking, the input side need not read all of the data in the file and can read the input record or character one by one in a divided manner and can write out one output record or character. Only a small number of programs, such as sort programs, have contrary characteristics. Therefore, the data input and output control system of the present invention may be applied widely to conventional batch type programs.

Figure 17:
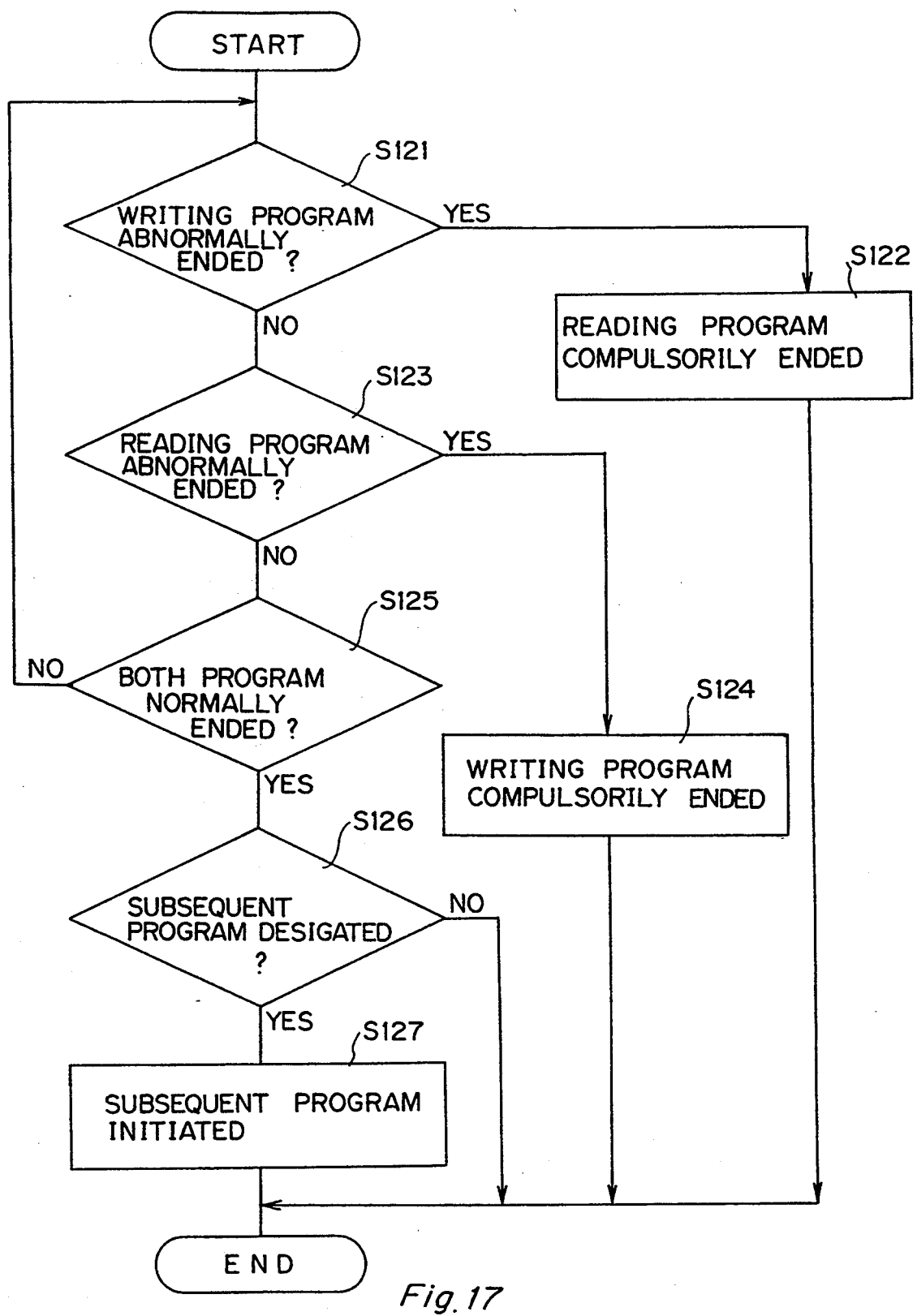
FIG. 17 is a flowchart of the embodiment in which the program ends in an abnormal manner.

FIG. 17 shows a flowchart of an embodiment when the writing program or reading program performs an abnormal end. In performing a parallel processing of the writing program and reading program, S121 judges whether or not the writing program conducts an abnormal end because of an error in the program or data or the execution stop designation by an operator and, when an abnormal end occurs, the reading program subjected to the parallel processing is compulsorily ended in S122, thereby ending the process.

If S121 judges that an abnormal end of the writing program does not occur, S123 judges whether or not the reading program performs an abnormal end and where the abnormal end happens. Then, the writing program subjected to the parallel processing is compusorily ended in S124, thereby ending the process. When an abnormal end does not occur in S123, S125 judges whether both writing and reading programs perform a normal ending, are executed until the last point and where the process is not yet ended, the process starting with S121 is repeated.

Where S125 judges that both programs subjected to parallel processes end in a normal manner and S126 judges whether or not the following program is designated by the user using the job control language. Where the designation does not exist, then the process ends naturally and where it does exist, the subsequent program is initiated in S126 and thereafter the process ends.

As described above, according to the present invention, even in the conventional batched type data input and output program, the file output program and the input program for processing the file can be subjected to parallel processing without changing or converting the program, thereby drastically decreasing the operation time. The input and output can be conducted by transferring the data from a main storage unit or using buffers in place of using the input and output apparatus such as the actual magnetic disc apparatus and magnetic tape apparatus, thereby further decreasing the execution time and decreasing the load of the central processing unit upon an operation of input and output. Therefore, the computer operating time and the operator labor can be greatly decreased in an enterprise using computers, thereby achieving a great cost saving.

Further, the program may be divided so that a function can be divided into a plurality of processes and the program can still be executed with a high performance. Therefore, the function can be positively divided into smaller portions upon developing the program, thereby achieving higher flexibility and freedom in developing the program. Therefore, development of the software can be divided into many assignments and the software can be more extensively used as parts, thereby achieving an increase in software productivity.

What is claimed is:

1. A data input/output control system of a batch type in a multi-task control operating system, for converting serially executable programs to parallelly executable programs, for executing a file output program for outputting data from a main storage unit to an auxiliary storage unit to form a file in the auxiliary storage unit, and for executing a file input program for processing the data in the file formed in the auxiliary storage unit by the file output program, said data input/output control system comprising:

data management means for controlling writing of data by the file output program and reading of data by the file input program;

job task management means for managing initiation, waiting and end of execution of the file output program and the file input program, based on a job control language which maps each logical file name in a program to a corresponding actual file name and defines a sequence of programs for sequential execution;

a data memory unit for storing data output by the file output program and input by the file input program;

input/output parallel management means for managing parallel processing of the file output program and the file input program;

input/output parallel control means including a data transfer unit for transferring data output by the file output program and input by the file input program from the main storage unit to said data memory unit;

an input/output parallel management table for storing a name of the file output program and a name of the file input program using a parallel management file stored in said data memory unit; and register designation means provided in said job task management means for changing the content of said input/output parallel management table in dependence upon designation by one of a program other than the file output program and the file input program and by a user, the file input program being executed in parallel with the file output program as designated.

2. The data input and output control system according to claim 1, wherein said input/output parallel management table stores data for a writing program as the file output program and data for a reading program as the file input program, the data for the writing and reading programs correspondingly stored as a pair, said input/output parallel management table storing an address and a length for data of each of the file output and file input programs in the main storage unit, the data for the writing program indicating at least one of a before-open state, a waiting state for reading-open, a before-writing state, a waiting state for reading, and a waiting state for reading-close, and the data for the reading program indicating at least one of a before-open state, a waiting state for a writing-open, a waiting state for a writing-before-reading, and a waiting state for a writing-close.

3. The data input and output control system according to claim 1, wherein the main storage unit includes a user memory unit for storing reading and writing programs, wherein said data management means comprises an open process unit for receiving an open command indicating a designated file by name, the open command issued by the writing program operating as the file output program and the reading program operating as the file input program, wherein the reading program and the writing program are stored in the user memory unit within the main storage unit by said job task management means in dependence upon the designation registered by said register designation means, and for transmitting the name of the designated file of the open command to said input/output parallel management means.

4. The data input and output control system according to claim 3, wherein said input/output parallel management means determines whether the name of the designated file of the open command received by said open process unit is stored in said input/output parallel management table, sets a state of one of the reading and writing programs issuing the open command using the parallel management file, the address and the length of the data stored in said input/output parallel management table, and returns control to said open process unit, and if the parallel management file does not contain the name of the file output program and the file input program correspondingly stored as a pair, causes said open process unit to execute the file input program after completing execution of the file output program, without performing parallel processing of the file output program and the file input program.

5. The data input and output control system according to claim 3, wherein said open process unit receives indication of correspondence between the writing program and the reading program from said input/output parallel management means when the address and the length of the data for the file output program and the file input program is set in the input/output parallel management table, in dependence upon the open command issued by the writing program using the parallel management file and the reading program corresponding thereto, and returns control to the writing program and the reading program.

6. The data input and output control system according to claim, wherein said data management means comprises a writing process unit for receiving a WRITE command issued by the writing program after control is returned to the writing program from said open process unit, and for notifying said data transfer unit of receipt of the WRITE command.

7. The data input/output control system according to claim 3, wherein said data management means comprises a writing process unit for receiving a READ command requesting a read of data issued by the reading program after control is returned to the reading program from said open process unit, and for requesting said data transfer unit to transfer data in dependence upon receipt of the READ command.

8. The input/output control system according to claim 6, wherein said data transfer unit transfers data from a first user-data area in the main storage unit having a first user-data address and length declared by the writing program to a second user-data area in the main storage unit having a second user-data address and length declared by the reading program, when the state of the reading program corresponding to the writing program issuing the WRITE command is waiting for a reading as a result of said input/output parallel management means referring to said input/output parallel management table, in dependence upon receipt of the WRITE command from said writing process unit, and in dependence upon control by said input/output parallel management means.

9. The data input/output control system according to claim 7, wherein said data transfer unit transfers data for the writing program from the main storage unit to a data area in the main storage unit for the reading program, when the state of the writing program corresponding to the reading program issuing the READ command is waiting for a writing as a result of said input/output parallel management means referring to said input/output parallel management table, means in dependence upon receipt of the READ command from the reading program, and in dependence upon control by said input/output parallel management means.

10. The data input/output control system according to claim 3, wherein said data management means comprises a close process unit for receiving a close command issued by the writing program after writing of data by the writing program is completed, or a close command issued by the reading program after reading of the data by the reading program is completed or when a data end is indicated by said open process unit after the writing program issues a close command, and for indicating receipt of the close command to said input/output parallel management means.

11. The data input/output control system according to claim 10, wherein said input/output parallel control means comprises an input/output parallel update unit for updating the state of the file output program or the file input program issuing the close command in said input/output parallel management table in dependence upon receipt of the close command by said close process unit, and for returning control to the file output program or the file input program issuing the close command through said close process unit.

12. The data input/output control system according to claim 1, wherein said job task management means comprises a task waiting deletion process unit for performing a task waiting and waiting deletion process, in dependence upon a determination by said input/output parallel management means whether control may be returned respectively to the file output or file input programs in dependence upon the state of both programs in said input/output parallel management table, during a parallel processing period from an open to a close of the file output program and the file input program.

13. An input/output control system of a batch type in a multi-task control operating system, for executing a file output program for outputting data from a main storage unit to an auxiliary storage unit to form a file in the auxiliary storage unit, the main storage unit including a user memory unit for storing reading and writing programs, and for executing a file input program for processing the data in the file formed in the auxiliary storage unit by the file output program, said data input/output control system comprising:

data management means for controlling writing of data by the file output program and reading of data by the file input program;

job task management means for managing initiation, waiting and end of execution of the file output program and the file input program, based on a job control language which maps each logical file name in a program to a corresponding actual file name and defines a sequence of programs for sequential execution;

a data memory unit for storing data output by the file output program and input by the file input program;

input/output parallel management means for managing parallel processing of the file output program and the file input program;

input/output parallel control means including a data transfer unit for transferring data output by the file output program and input by the file input program from the main storage unit to said data memory unit in dependence upon the managing of said input/output parallel management means without transferring the data through the auxiliary storage unit;

an input/output parallel management table for storing a name of the file output program and a name of the file input program using a parallel management file stored in said data memory unit;

parallel designation register deletion processing means provided in said job task management means for changing the content of said input/output parallel management table in dependence upon designation by one of a program other than the file output program and the file input program and user, the file input program being executed in parallel with the file output program as designated, and wherein if execution of one of the file output program and the file input program ends in an abnormal state indicating program termination because of an abnormal execution factor, execution of the other of the file output program and the file input program is made to end simultaneously in an abnormal state, and if execution of each of the file output program and the file input program ends in a normal state and a program for subsequent execution is designated, the program for subsequent execution is automatically initiated.

14. The data input/output control system according to claim 13, wherein said input/output parallel management table stores data for a writing program as the file output program and data for a reading program as the file data input program the data for the writing and reading programs correspondingly stored as a pair, said input/output parallel management table storing an address and length for data of each of the file output and file input programs in the main storage unit, the data for the writing program indicating at least one of a before-open state, a waiting state for reading-open, a before-writing state, a waiting state for reading and a waiting state for reading-close and the data for the reading program, indicating at least one of a before-open state, a waiting state for writing-open, a waiting state for writing-before-reading, and a waiting state for writing-close.

15. The data input/output control system according to claim 13, wherein said data management means comprises an open process unit for receiving an open command issued by a writing program as the file output program and a reading program as the file input program, the reading program and the writing program being stored in the user memory unit within the main storage unit by said job task management means in dependence upon the designation by the other of the file output program and the file input program or user, and for transmitting a name of a designated file of the open command to said input/output parallel management means.

16. The data input/output control system according to claim 15, wherein said input/output parallel management means determines whether the name of the designated file of the open command received by said open process unit is stored in said input/output parallel management table, sets a state of one of the reading and writing programs issuing the open command using the parallel management file, the address and the length of the data corresponding to the program issuing the open command in said input/output parallel management table, thereby returning control to said open process unit.

17. The data input/output control system according to claim 15, wherein said open process unit receives indication of completion of correspondence between the writing program and the reading program from said input/output parallel management means when the address and the length of the data for the writing and reading programs are set in said input/output parallel management table, in dependence upon an open command issued by the writing program using the parallel management file and the reading program corresponding thereto, and returns control to the file writing program and the file reading program.

18. The data input/output control system according to claim 15, wherein said data management means comprises a writing process unit for receiving a WRITE command issued by the writing program after control is returned to the writing program from said open process unit, and notifying said data transfer unit of receipt of the WRITE command.

19. The data input/output control system according to claim 15, wherein said data management means comprises a writing process unit for receiving a READ command requesting a read of data issued by the file input program after control is returned to the reading program from the open process unit, and for requesting said data transfer unit to transfer data in dependence upon receipt of the READ command.

20. The data input/output control system according to claim 19, wherein said data transfer unit transfers data for the writing program from the main storage unit to a data area for the reading program in the main storage unit, when the state of the reading program corresponding to the writing program issuing the WRITE command is waiting for reading as a result of said input/output parallel management means referring to said input/output parallel management table in dependence upon receipt of the WRITE command from said writing process unit, and in dependence upon control by said input/output parallel management means.

21. The data input/output control system according to claim 18, wherein said data transfer unit transfers data for the writing program from the main storage unit to a data area in the main storage unit for the reading program, when the state of the writing program corresponding to the reading program issuing the READ command is waiting for a writing as a result of said input/output parallel management means referring to said input/output parallel management table, in dependence upon receipt of the READ command by said open process unit, and in dependence upon control by said input/output parallel management means.

22. The data input/output control system according to claim 19, wherein said data management means comprises a close process unit for receiving a close command issued by the writing program when writing of the data by the writing program is completed, or a close command issued by the reading program when reading of the data by the reading program is completed, or when a data end is notified from said open process unit after the writing program issues a close command, and for indicating receipt of the close command to said input/output parallel management means.

23. The data input/output control system according to claim 22, wherein said input/output parallel control means comprises an input/output parallel update unit for updating the state of the one of the reading and writing programs issuing the close command in said input/output parallel management table in dependence upon receipt of the close command from said close process unit, and for returning control to the one of the reading and writing programs issuing the close command through said close process unit.

24. The data input and output control system according to claim 14, wherein said job task management means comprises a task waiting deletion process unit for performing a task waiting and waiting deletion process, in dependence upon a determination by said input/output parallel management means whether control may be returned to one of the file output program and the file input program, in dependence upon the state of the file output program and the file input program in said input/output parallel management table, during a parallel processing period from an open to a close of the file output program and the file input program.

* * * * *

UNITED STATES PATENT AND TRADEMARK OFFICE
CERTIFICATE OF CORRECTION

PATENT NO. : 5,404,520  
DATED : April 4, 1995  
INVENTOR(S) : Masayuki SONOBE

Page 1 of 2

It is certified that error appears in the above-indentified patent and that said Letters Patent is hereby corrected as shown below:

Cover page, OTHER PUBLICATIONS, COL. 2, line 5, change "Impementation" to --Implementation--

IN THE DRAWINGS  
Fig. 11B, sheet 13, Block S75, change "WHETER" to --WHETHER--  
Fig. 13C, sheet 18, Block S91, change "RERIEVED" to --RETRIEVED--  
Fig. 15A, sheet 22, Block S111, change "WAITENG" to --WAITING--  
Fig. 15B, sheet 23, Block S118, change "BEFOR" to --BEFORE--  
Fig. 17, sheet 26, Block S126, change "DESIGATED" to --DESIGNATED--

Col. 2, line 16, change "Tereafter" to --Thereafter--  
Col. 3, line 58, change "122" to --122--  
      line 66, change "122" to --122--  
Col. 7, line 56, change "disc" to --disc.--  
Col. 11, line 21, change "starts,1" to --starts,--

UNITED STATES PATENT AND TRADEMARK OFFICE
CERTIFICATE OF CORRECTION

PATENT NO. : 5,404,520
DATED : April 4, 1995
INVENTOR(S) : Masayuki SONOBE

It is certified that error appears in the above-indentified patent and that said Letters Patent is hereby corrected as shown below:

```
Col. 14, line 23, change "ant" to --and--
Col. 17, line 43, after "claim" insert --3--
Col. 19, line 51, after "close" insert --,--
         line 52, delete "," first occurrence
```

Signed and Sealed this

Twenty-seventh Day of June, 1995

Attest:

BRUCE LEHMAN

Attesting Officer     Commissioner of Patents and Trademarks